United States Patent
Huynh et al.

(10) Patent No.: US 11,961,168 B1
(45) Date of Patent: Apr. 16, 2024

(54) GENERATING IMAGES USING IMAGE ASSETS EXTRACTED FROM OTHER IMAGES

(71) Applicant: Amazon Technologies, Inc., Seattle, WA (US)

(72) Inventors: Steve Huynh, Seattle, WA (US); Erik Martin Zigman, Sammamish, WA (US); Ronald Diaz, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 415 days.

(21) Appl. No.: 17/332,355

(22) Filed: May 27, 2021

(51) Int. Cl.
G06V 10/40 (2022.01)
G06F 18/2413 (2023.01)
G06T 3/40 (2006.01)
G06T 11/60 (2006.01)

(52) U.S. Cl.
CPC ........ G06T 11/60 (2013.01); G06F 18/24147 (2023.01); G06T 3/40 (2013.01); G06V 10/40 (2022.01); G06V 2201/10 (2022.01)

(58) Field of Classification Search
CPC ..... G06T 11/60; G06T 3/40; G06F 18/24147; G06V 10/40; G06V 2201/10
See application file for complete search history.

(56) References Cited

U.S. PATENT DOCUMENTS 10,248,663 B1 * 4/2019 Keisler ................. G06F 16/29

OTHER PUBLICATIONS

Lee, Donghoon, Tomas Pfister, and Ming-Hsuan Yang. "Inserting videos into videos." In Proceedings of the IEEE/CVF Conference on Computer Vision and Pattern Recognition, pp. 10061-10070. 2019. (Year: 2019).*

Lalonde, Jean-François, Derek Hoiem, Alexei A. Efros, Carsten Rother, John Winn, and Antonio Criminisi. "Photo clip art." ACM transactions on graphics (TOG) 26, No. 3 (2007): 3-es. (Year: 2007).*

* cited by examiner

*Primary Examiner* — Carol Wang
(74) *Attorney, Agent, or Firm* — Eversheds Sutherland (US) LLP

(57) ABSTRACT

Systems, devices, and methods are provided for processing images using machine learning. Features may be obtained from an image using a residual network, such as ResNet-101. Features may be analyzed using a classification model such as K-nearest neighbors (K-NN). Features and metadata extracted from images may be used to generate other images. Templates may be used to generate various types of images. For example, assets from two images may be combined to create a third image.

20 Claims, 14 Drawing Sheets

GENERATING IMAGES USING IMAGE ASSETS EXTRACTED FROM OTHER IMAGES

BACKGROUND

Generating images from other images may be a challenging task. In some cases, different elements of an image may exist across multiple images, but cannot be easily utilized to create the desired image. For example, there may exist a first image of Team A playing Team B and a second image of Team C playing Team D, but no image exists of Team A playing Team C. Furthermore, there may be arrangement of other elements within the images that prevents two images from being easily combined. In some cases, a large number of images with common formats may need to be generated.

Figure 1:
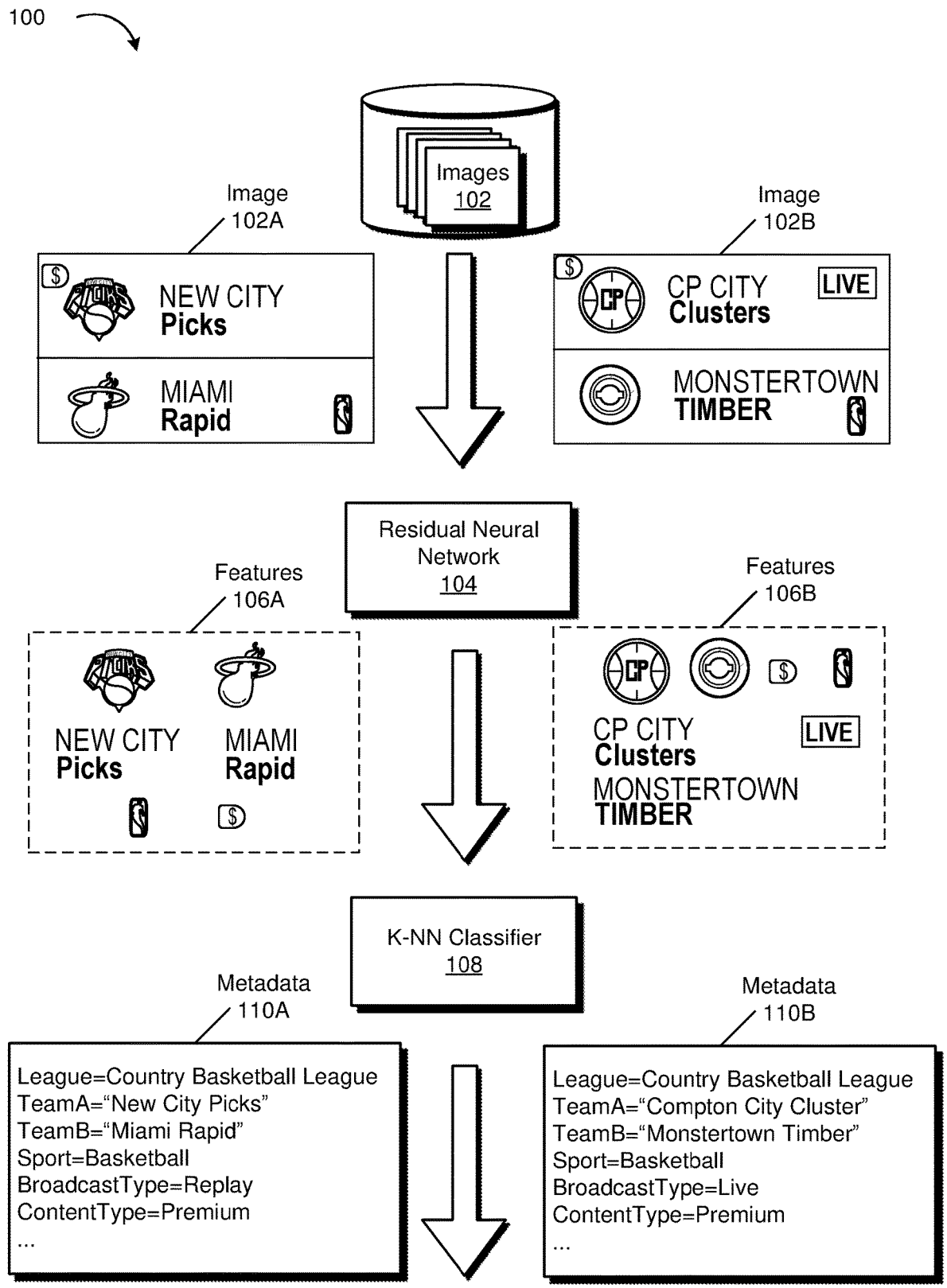
FIG. 1 illustrates a computing environment in which a residual network and classification model are utilized to process images, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for machine learning systems for processing imagery. Techniques described in greater detail below may be used to automatically generate new imagery for content partners. A system such as a multimedia service provider may receive, retrieve, or otherwise obtain input images that may be used to create additional content. Input images may be made available to the system by a partner organization. Images may be processed using neural networks to perform a combination of feature extraction and object classification tasks. Metadata may be generated for processed images. Assets and/or metadata may be electronically stored and used to generate new images, as described in greater detail below.

Images may be processed using a combination of a residual network and a K-nearest neighbors classifier to extract features from an image and determine metadata associated with the features and/or image. Features, in the context of computer vision, may refer to certain portions of images that convey information. A residual network may receive images and extract corresponding features from those images. A residual network (ResNet) may refer to a type of artificial neural network (ANN) that performs feature extraction, which may involve detecting areas of interest within an image. In various embodiments, an image received from a partner is used as an input image to a ResNet and a set of features are generated. These features may encode various aspects of the image. For example, in the context of FIG. 1, an image of a box score may have various features such as the team logos, team names, as well as other graphical elements that are shown throughout the image. Each of these portions of the image may be referred to as a feature.

Features extracted from an image using one or more convolutional neural networks such as a ResNet may be provided to a K-nearest neighbors (K-NN) classifier 108 that performs classification and identification on the features and determines metadata about the features. In various embodiments, K-NN classifier 108 receives image-based features and determines structured metadata. As an example, in FIG.

1, a ResNet may identify that the pixels occupied by the team logo are areas of interest, but may not necessarily indicate that the pixels correspond to a team logo, which team it is, what sport it is, what league the team is in, and so on. A classification model may be used to determine such metadata. Classification models may determine various information, for example, whether an event is a live event or a replay based on the presence or absence of a "LIVE" badge, what sport is being played, what teams are playing, and more. Features and metadata may be persisted in a data store and provide a catalog of assets that can be used to create other images. One such scenario may involve the generation of team matches for an upcoming sports seasons. Each season may present similar but new images that need to be created, for example, based on game times, records, combinations of teams, players on such teams (which may be featured on banners and promotional materials), and more.

As described in greater detail below, templates may be used to generate new images based on assets extracted from other images. A template can be generated by a user or programmatically generated based on rules for creating a new image. For example, box scores from a previous sports season may be mined for assets and then used to create new box score images for the next season, perhaps after the season schedule is announced or otherwise made available. A template may encode elements of an image, such as where various elements should be located, their size, a size requirement such as the maximum size for an asset that is being used for the image, and so on. An element may also encode metadata about what asset should be used for the element. For example, an event template for a box score may encode various elements, such as team logos, team name texts, team city texts, and more. A generic template may simply indicate elements for teams A and B, and a more specific template may then specify that which specific teams these refer to.

A template may specify rules regarding the presentation of different elements. An element may encode information regarding the position, shape size, etc. of an element. Metadata for an element may specify what content is suitable for presentation at the specified position. For example, an element may be specific where a logo for a specific team should be placed in a box score image being generated. Templates allow for different image generation rules for overlapping content. Element rules may define whether one element is to be overplayed on top of another element, whether they are to be transparent, and other visual effects that may help define the visual presentation of two overlapping (e.g., partially overlapping) elements. Templates may be used to quickly generate content that conforms to specific rules for visual presentation, providing for more aesthetic image generation.

Images may be generated by obtaining a template, obtaining assets that are suitable for use in the template, and then generating the image based on template and assets. Templates may comprise elements for text, vector art, and images. Elements may include metadata that is used to retrieve specific assets such as images from an assets database and used to generate various types of custom generated images. Accordingly, a user may be able to create various images by defining templates and providing instructions to a system to generate an image based on the template description, provided that assets needed by the template can be retrieved.

Templates may be used to programmatically generate new images at scale. For example, when a new sports season is announced, the game schedules may be published and a generic templates may be generated for every game on the schedule. Then, a system may iterate through each game in the schedule and create a specific template for the game by specifying which teams are Team A and Team B respectively, and perhaps adding additional information such as whether the game will be a premium broadcast, and so on. In this way, images may be generated at scale requiring little or no manual intervention once appropriate templates have been defined.

Illustrative Processes and Use Cases

FIG. 1 illustrates a computing environment 100 in which a residual network (ResNet) and classification model are utilized to process images, in accordance with one or more example embodiments of the present disclosure. In at least one embodiment, one or more neural networks are utilized to perform a combination of feature extraction and object classification tasks. Metadata may be generated for processed images. Assets and/or metadata may be electronically stored and used to generate new images, as described in greater detail below. FIG. 1 may be implemented in the context of a service provider, for example, a multimedia service provider that generates and serves multimedia content such as live and/or on-demand video to clients.

Images 102 may refer to one or more images with visual data. Images may, for example, be JPEG images of any suitable resolution. Images may also refer to individual frames of a video or multimedia stream. In various embodiments, images 102 are provided to a service provider by a partner organization. In other cases, a service provider finds and retrieves images that can be used as per an agreement between the service provider and a partner organization. For example, a partner organization may own rights to use certain media content and authorize a service provider to use such media content. The service provider may retrieve the media content from the partner organization, which may be made available by the partner organization via its website, a data repository, or other suitable means. Images 102 may be stored within any suitable data store, such as a data storage service of the service provider. Images 102 may be from various sources and be encoded in different formats, including video and image files, vector art, and more. Images 102 may be one of many examples of multimedia content that can be used in the context of FIG. 1. For example, in some embodiments (not shown in FIG. 1), a multimedia content source is a live video stream comprising image frames that are continuously displayed (e.g., at a rate of over 20 image frames per second). In some embodiments, a video stream is analyzed in real-time for various features which may be modified in real-time or near real-time—one such example may be for localization, where a live stream is provided (e.g., by a partner sports network) in one language, and visual elements such as the team names, stats, etc. may be programmatically translated into a second different language for broadcast to another audience (e.g., different locale that predominantly speaks the second language).

In at least one embodiment, images 102 are processed using a combination of a residual network 104 and a K-nearest neighbors classifier 108 to extract features from an image and determine metadata associated with the features and/or image. FIG. 1 depicts illustrative examples where images are processed using machine learning.

Image 102A may refer to an illustrative example of one of images 102. In various embodiments, a large number of images 102 are obtained by a service provider, which processes and analyzes the images using workflows and processes described in this disclosure. For example, images 102 may be image assets from a sports-related organization that includes images for game matchups from preceding seasons. For example, there may be image assets within images 102 for a first matchup between the "New City Picks" and "Miami Rapid" and a second matchup between the "CP City Cluster" and "Monstertown Timber" but no matchup images for "Miami Rapid" and "CP City Cluster" perhaps because the teams have never played each other or for a variety of other reasons. Image 102A may be referred to as a first image associated with a first matchup between the "New City Picks" and "Miami Rapid" teams. Likewise, image 102B may be referred to as a second image associated with a second matchup between the "CP City Cluster" and "Monstertown Timber" teams.

Residual network 104 may receive images and extract corresponding features from those images. A residual network (ResNet) may refer to a type of artificial neural network (ANN) that utilizes skip connections to skip over layers. ResNet models, in various embodiments, are implemented with double or triple player skips that include in nonlinearities (ReLU) and batch normalization in between. Residual network 104 may be implemented at least in part using a convolutional neural network with several layers (e.g., 101 layers). In various embodiment, residual network 104 is a convolutional neural network trained, based on image data, to extract features from images. Features, in the context of computer vision, may refer to certain portions of images that convey information. Feature extraction may refer to a process to detect features within an image and then determining a boundary around the detected feature. Pixels of an image forming the boundary of a feature may be extracted to isolate a feature from the rest of an image. Various types of boundaries and extracted features may be determined. Non-limiting examples of residual network 104 include ResNet-18, ResNet-34, ResNet-50, ResNet-101, and ResNet-152. Other types of neural networks that perform feature extraction may be utilized in place of, or in combination with, residual network 104. As described herein, neural networks may refer to any suitable type of artificial neural network suitable for a particular task.

Features 106A may refer to one or more features that residual network 104 extracts from corresponding image 102A. A feature may refer to a portion of an image that is extracted from an image. Residual network 104 may detect various features in an image, determine boundaries for each image, and then extract the features found in each boundary. Feature extraction may involve making a copy of a portion of an image. In various embodiments, features merely convey that a feature encodes certain information (e.g., as described in the context of the field of information theory) but not necessarily what that information is. For example, residual network 104 may be used to extract the logo in the bottom right corner as a feature comprising a block of pixels, but does not provide any metadata relating to what that block of pixels represents. Recognition of what various features are or represent may be discussed in connection with K-nearest neighbors classifier 108, as described in greater detail below.

An illustrative example of feature extraction using residual network 104 illustrated in FIG. 1 is described in greater detail below: image 102A may depict a box score that conveys information through various elements, such as the logos, cities, and names of respective teams, as well as a league logo and a "$" in the upper-right corner signifying that the event is a premium event that may require a subscription or various other types of monetized access models. Image 102A may be provided as an input image to residual network 104 (e.g., for training or inferencing) and residual network may extract features 106A from image 102A by performing feature detection and then boundary detection of the detected features. For image 102A, various features extracted may include the two logos, the two team names, the logo in the lower-right region of the image, and the premium content object in the upper-right region with the stylized dollar sign within a rounded background. Different types of features may be extracted based on the model being used for feature extraction. For example, some models in accordance with at least one embodiment described herein may extract "Miami" separately from "Rapid" whereas other models may extract both lines of text together as a singular feature. Various residual networks may be trained to recognize that different fonts or types (e.g., all caps or bold) may refer to different features, but such need not be the case. In some embodiments, both the logo and adjacent text may be extracted together as a single feature. Accordingly, various sets of features may be extracted from the same image based on the specific neural network (e.g., weights and/or structure of the underlying neural network) and type of neural network used. FIG. 1, according to at least one embodiment, illustrates features 106A comprising the following set of features: (1) Picks logo; (2) Rapid logo; (3) "NEW CITY" text; (4) "Picks" text; (5) "MIAMI" text; (6) "Rapid" text; (7) league logo; and (8) stylized "$" element.

In various embodiments, K-nearest neighbors (K-NN) classifier 108 receives features 106A as inputs and determines metadata 110A as outputs. K-NN classifier may refer to a non-limiting example of a type of classification model that can be used to extract metadata from features. In various embodiments, K-NN classifier 108 receives image-based features and determines structured metadata. A single feature may map to multiple instances of metadata. For example, as illustrated in FIG. 1, feature 106A includes a logo element, which may be used to identify the specific league that the logo corresponds to—in this example, the "Country Basketball League" as well as that the sport is "Basketball." In some cases, the league does not convey the sport type, for example, "Premier League" corresponds to "European Football." K-nearest neighbors classifier 108, in some embodiments, may recognize the absence of an element to determine metadata. For example, note that features 106A does not include a "LIVE" badge whereas features 106B does include a "LIVE" badge—accordingly, it may be determined based on the absence of a "LIVE" badge that image 102A is not a live event, and hence, is a replay, if the only options for broadcast types are live and replay. In some embodiments, multiple elements are combined to determine a single piece of metadata. For example, the two teams in image 102A may be extracted and queried against a data source for more information. If the two teams only play each other once, additional metadata for the game time and location may be added to metadata 110A. As illustrated in FIG. 1, K-nearest neighbors classifier 108 may identify that the stylized "$" element corresponds to a premium content type, whereas the lack of such an element (not shown in FIG. 1) may indicate that the event is a free broadcast. In some embodiments, metadata fields may have subfields. For example, the metadata fields for the teams may include subfields for the team city and team name, which are aggregated in the parent field. In some embodiments, a sub-field for an abbreviated team name or team city may also be associated with the team field. For example, in image 102B, the top team is "CP CITY." A data source may be queried to determine additional information, such as to make a determination that "CP CITY" is the abbreviated team name and that the full team city is "Compton City." As seen in FIG. 1, the abbreviated team name "CP CITY" may have been used instead of "COMPTON CITY" due to formatting limitations, as spelling out the entire city name could cause the city name to overlap with the "LIVE" badge, as seen in image 102B. As another example, metadata 110B may encode an abbreviated city name for "MONSTERTOWN" as "M'TOWN" and the abbreviated city name may be utilized in place of the full city name based on formatting and size requirements, for example, as discussed in greater detail below in connection with FIG. 5. Metadata may refer to one or more properties of a feature, such as language information of text or graphics in the feature. Metadata may be associated with specific features and/or images. For example, the stylized logos of image 102A may have metadata that associates them to their respective teams.

In various embodiments, features and their respective metadata may be extracted and recognized using a combination of a feature extraction component and a classification component. These components may include one or more neural networks trained on similar image data. Features and metadata may be stored and associated with each other (e.g., using a relational database). Features and metadata may be stored as assets that can be used to generate additional content, such as new images.

Techniques described in connection with FIG. 1 may be utilized in embodiments described in connection with other figures, such as embodiments discussed in connection with FIGS. 2-14.

Figure 2:
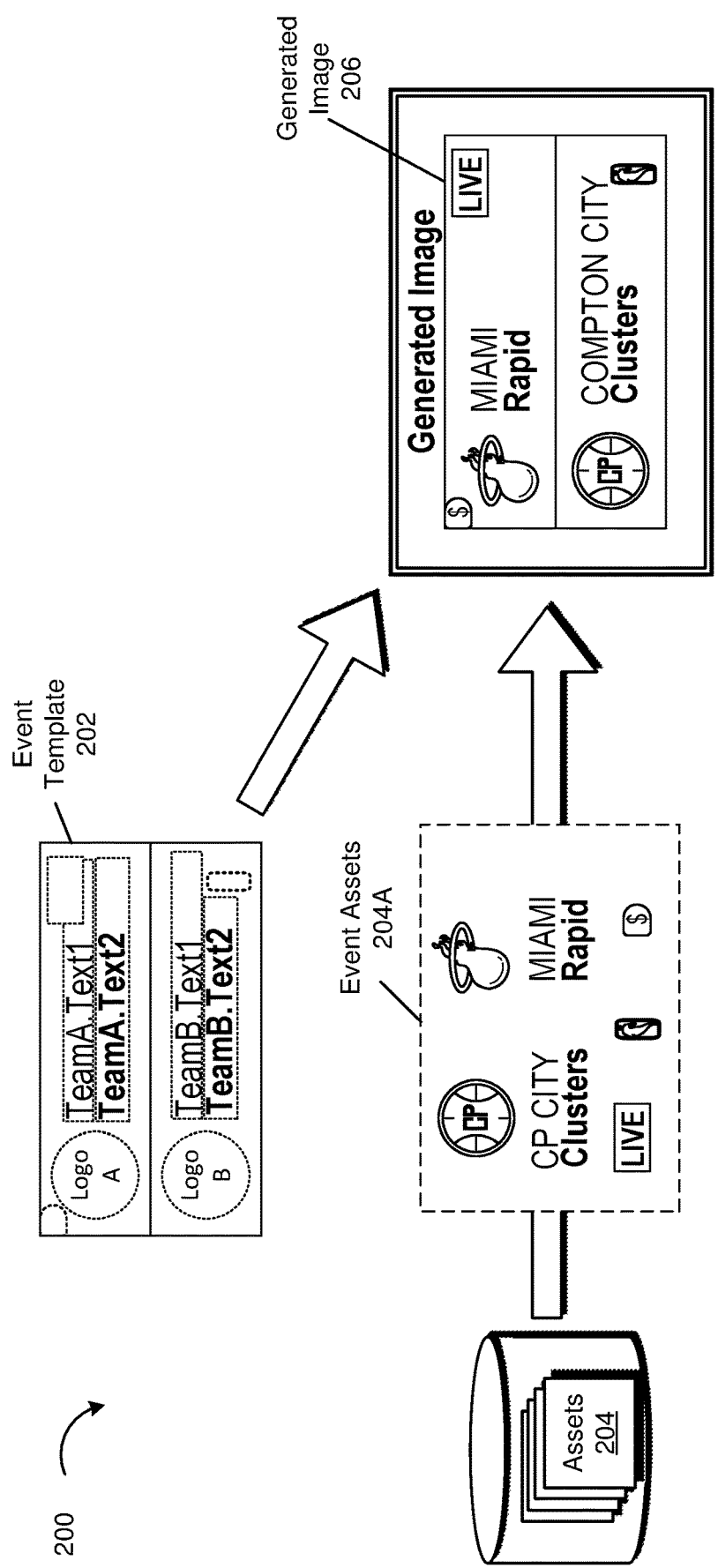
FIG. 2 illustrates a computing environment in which an event template and assets are used to create generated image, in accordance with one or more example embodiments of the present disclosure.

FIG. 2 illustrates a computing environment 200 in which an event template 202 and assets 204 are used to create generated image 206, in accordance with one or more example embodiments of the present disclosure. In at least one embodiment, techniques described in connection with FIG. 1 are used to extract various features and determine metadata for the extracted features. Features and metadata may, either individually or collectively, be stored as assets in any suitable data storage system, such as a database system, object store, or a combination thereof.

Event template 202 may refer to a template that can be generated by a user or programmatically generated based on rules for creating a new image. For example, box scores from a previous sports season may be mined for assets and then used to create new box score images for the next season, perhaps after the season schedule is announced or otherwise made available. A template may encode elements of an image, such as where various elements should be located, their size, a size requirement such as the maximum size for an asset that is being used for the image, and so on. An element may also encode metadata about what asset should be used for the element. For example, event template 202 illustrates various elements of the template, such as Logo A, TeamA.Text1, and TeamA.Text2. A generic template may simply indicate elements for teams A and B, and a more specific template may then specify that Team A is the Miami Rapid and Team B is the CP City Cluster.

FIG. 2 illustrates event template 202, which may include boundaries for various elements, as well as information about what assets should be included in each element. For illustrative purposes, event template 202 may comprise a set of elements and the metadata encoded in event template may indicate that team A (e.g., logo A) should be for Miami Rapid, and team B should be Compton City Clusters. In at least one embodiment, event template 202 includes metadata indicating various fields relating to the image, such as whether the box score is for a live event, whether it is premium content that may require the subscription, and so on. If the template indicates the game will be streamed live, then a "LIVE" badge may be included in a position specified by an element of the template.

A template may specify rules regarding the presentation of different elements. For example, the template may allow for different image generation rules for overlapping content. Element rules may define whether one element is to be overplayed on top of another element, whether they are to be transparent, and other visual effects that may help define the visual presentation of two overlapping (e.g., partially overlapping) elements. Consider, as illustrated in FIG. 1, how the "TeamA.Text1" box overlaps with a box in the upper-right region, which may be for a "LIVE" badge when the event is a live event and may be empty when the event is a replay. Event template 202 may include an element rule indicating that the team name for Team A may occupy as much room as indicated by its dotted rectangle, but that it is not allowed to overlap with the element for the "LIVE" badge if it exists. Accordingly, if Team A were a team with a long city name such as "MONSTERTOWN" then an element rule may specify that abbreviated city name such as "M'TOWN" may be an alternate form of the long city name that can be used when the event is a live event to avoid overlapping with the "LIVE" badge—thereby obfuscating part of the city name—but that the full city name "MONSTERTOWN" may be used on replays where the "LIVE" badge is not present.

Templates generated in this fashion may be used to quickly generate content that conforms to specific rules for visual presentation, providing for more aesthetic image generation. For example, consider the logo shown in the bottom-right region of various box scores illustrated in FIG. 1 and FIG. 2—it may be the case that the logo changes one day in a manner that changes the shape—for example, a new circular logo that is wider may replace the rectangular logo. The added width of the new logo may make it so that simply replacing the old logo with the new logo may cause the text for some teams with long names to overlap with the new logo. However, by using techniques described herein, templates may be used to quickly generate updated images and replace long team names with abbreviated team names to conform to element rules that prohibit overlapping of team name text element with the league logo element.

Assets 204 may refer to features, images of features, metadata, portions thereof, or combinations thereof. Features and metadata discussed herein may be in accordance with those discussed in connection with FIG. 1. In various embodiments, event template 202 specifies metadata for various elements, and assets 204 may be retrieved based on the element descriptors. Continuing with the example from above, if the event template indicates that team A is the Miami Rapid, then a system (e.g., multimedia service provider generating overlays for sports content) may query a data store housing assets 204 and request a logo for the specified team, as well as the text 1 and text 2 fields. These fields may correspond, for example, to the team city and team name. This process may be repeated for team 2, which may be indicated to be the CP City Cluster. Assets for these teams may have been processed and created through an ingestion process, for example, as described in connection with FIG. 1. Asset images may be associated with metadata indicating what the asset image represents, such as a team logo. Asset images may be associated with corresponding asset metadata in any suitable manner, such as through the use of a database system that stores the metadata and the corresponding asset image and/or a reference to the corresponding asset image.

In at least one embodiment, FIG. 2 illustrates event assets 204A for a specific event template. Event assets 204A may comprise image assets, text assets, or a combination thereof. In at least one embodiment, event template 202 comprises elements defining the position of various elements (e.g., x-y coordinates), presentation rules (e.g., overlapping allowed or not), and more. Event assets may be retrieved from an assets database, an external data source, or from various other systems. In at least one embodiment, event assets 204A comprises asset images for two team logos, asset text for the teams, an asset image for a "LIVE" badge, an asset image for a league logo, and an asset image for premium content. In various embodiments, asset images may be localized. For example, the asset image for the team logos may be the same across various locales and regions, but there may be various versions of the "LIVE" badge asset image for various locales, based on language. For example, the "LIVE" badge may be a translation "EN VIVO" badge for a Spanish-localized version of the generated image if the event template indicates that it is for a Spanish-speaking target language. Likewise, the premium content asset image may be different based on locale, for example, if the image is being generated for a locales which use a currency other than the US Dollar, then the corresponding asset image for premium content in that language may include a different stylized currency symbol in the localized asset image.

Generated image 206 may be created by obtaining a template, obtaining assets based on the template, and then generating the image based on template and assets. Templates may comprise elements for text, vector art, and images. Elements may include metadata that is used to retrieve specific assets such as images from an assets database and used to generate various types of custom generated images such as generated image 206. Accordingly, a user may be able to create various images by defining templates and providing instructions to a system to generate an image based on the template description, provided that assets needed by the template can be retrieved.

Templates may be used to programmatically generate new images at scale. For example, when a new sports season is announced, the game schedules may be published and a generic templates may be generated for every game on the schedule. Then, a system may iterate through each game in the schedule and create a specific template for the game by specifying which teams are Team A and Team B respectively, and perhaps adding additional information such as whether the game will be a premium broadcast, and so on. In this way, images may be generated at scale requiring little or no manual intervention once appropriate templates have been defined.

Techniques described in connection with FIG. 2 may be utilized in embodiments described in connection with other figures, such as embodiments discussed in connection with FIGS. 1 and 3-14.

In some embodiments, elements may be generated using assets from two or more source images. For example, a preview graphic between Team A and Team B may include a "face off" scene where a helmet emblazoned with Team A's logo is shown in opposition to a helmet with Team B's logo. In various embodiments, the helmet is extracted as an asset which includes the logo as a sub-asset. A template may be used to create a new preview graphic between Team X and Team Y by specifying a helmet element with a sub-element indicating Team X and Team Y's logos to generate a similar "face off" scene.

Figure 3:
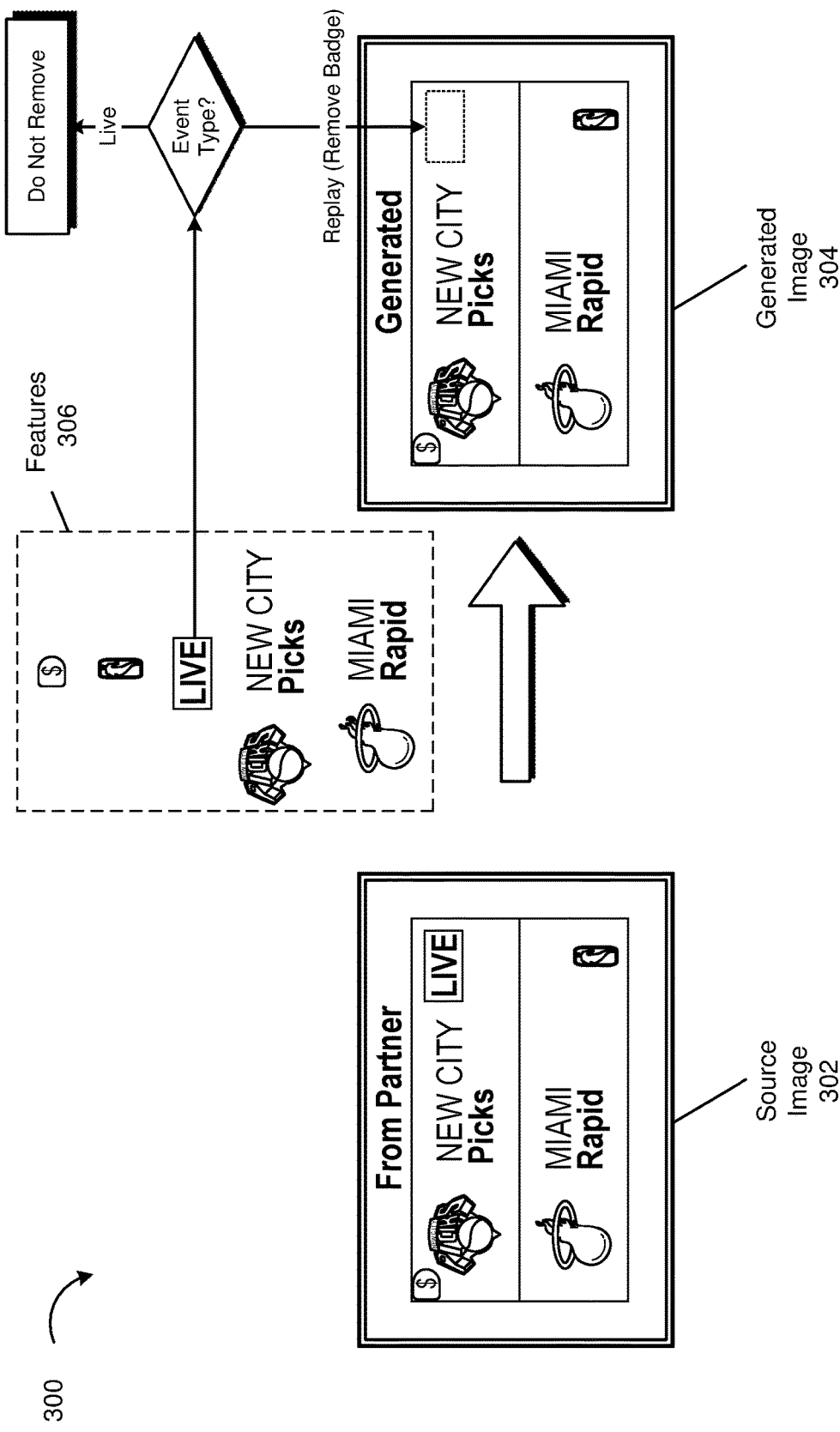
FIG. 3 illustrates a computing environment in which a transformation is performed on a source image, based on event metadata, to create a generated image, in accordance with one or more example embodiments of the present disclosure.

FIG. 3 illustrates a computing environment 300 in which a transformation is performed on a source image, based on event metadata, to create a generated image, in accordance with one or more example embodiments of the present disclosure. In at least one embodiment, a multimedia service provider obtains a source image 302 and modifies it based on event metadata to create a generated image 304. Techniques described in connection with FIG. 1 and FIG. 2 may be utilized in embodiments described in connection with FIG. 3. FIG. 3 may be implemented in the context of a multimedia service provider or any other suitable computer system.

Source image 302 may be an image that is provided by a partner or any other suitable data source. In various embodiments, the source image 302 may include certain visual elements which are applicable in some cases but not in others. FIG. 3 illustrates one such case, where a partner may have broadcasted an event live and then the event is being broadcasted again at a later point in time as a reply by a multimedia service provider, in accordance with at least one embodiment. In at least one embodiment, multimedia service provider receives, retrieves, or otherwise obtains source image 302. Source image 302 may be retrieved from a partner that broadcasted the event live, and therefore included a "LIVE" badge in the box score. However, if a multimedia service provider is showing a replay of the image, then the source image 302 provided by the partner is not, in its original form, suitable for use, as it would be inappropriate to include a "LIVE" badge for a replay.

In various embodiments, techniques described herein may be utilized (e.g., by multimedia service provider) to modify various elements of source image 302 based on event metadata. In some embodiments, event metadata for an event may specify properties for an event, such as which teams are playing, whether the broadcast is live or replay, a target language for the broadcast, and so on. In some cases, source image 302 provided by a partner may be analyzed using a residual network to extract features and then a classification model to determine metadata about the event. This metadata may be compared against metadata for an image to generate. The metadata may indicate that the image being generated is a box score for a replay between New City Picks and Miami Rapid and is premium content. Multimedia service providers may include executable code such as one or more software applications that, when executed by one or more processors, retrieve source image 302 as an image that is similar to the image it is being requested to generate. Source image 302 may be analyzed to determine that it was a live event, and then the metadata for the generated image may be inspected to determine whether it is a live event. If the metadata indicates that generated image 304 is for a live broadcast, then there is no need to remove the "LIVE" badge from the source image 302. However, if it is a replay, then the "LIVE" badge may be removed from the generated image 304. This may be performed by using a residual network to extract features 306 from source image 302, identify that a feature of source image 302 corresponds to a "LIVE" badge or other symbol relating to a live event, and then the boundary for the feature relating to live broadcast may be used to identify a portion of source image 302 that should be omitted when creating generated image 304.

In at least one embodiment, techniques described in connection with FIG. 3 may be utilized to localize content. In at least one embodiment, features 306 are extracted from source image 302 and a classification model identifies this set of features as comprising asset images for two team logos, asset text for the teams in English, an asset image for a "LIVE" badge in English, an asset image for a league logo, and an asset image for premium content with a US dollar currency symbol. In various embodiments, asset images may be localized. For example, the asset image for the team logos may be the same across various locales and regions, but there may be various versions of the "LIVE" badge asset image for various locales based on language. For example, the "LIVE" badge may be a translation "EN VIVO" badge for a Spanish-localized version of the generated image if the event template indicates that it is for a Spanish-speaking target language. Likewise, the premium content asset image may be different based on locale, for example, if the image is being generated for a locales which use a currency other than the US Dollar, then the corresponding asset image for premium content in that language may include a different stylized currency symbol in the localized asset image. In some cases, some content may be modified through localization whereas other content remains the same. For example, content being localized for Ecuador may involve localization of the team name text, the "LIVE" badge, but the premium content image may remain the same, as Ecuador's official language is Spanish and uses the US dollar.

Figure 4:
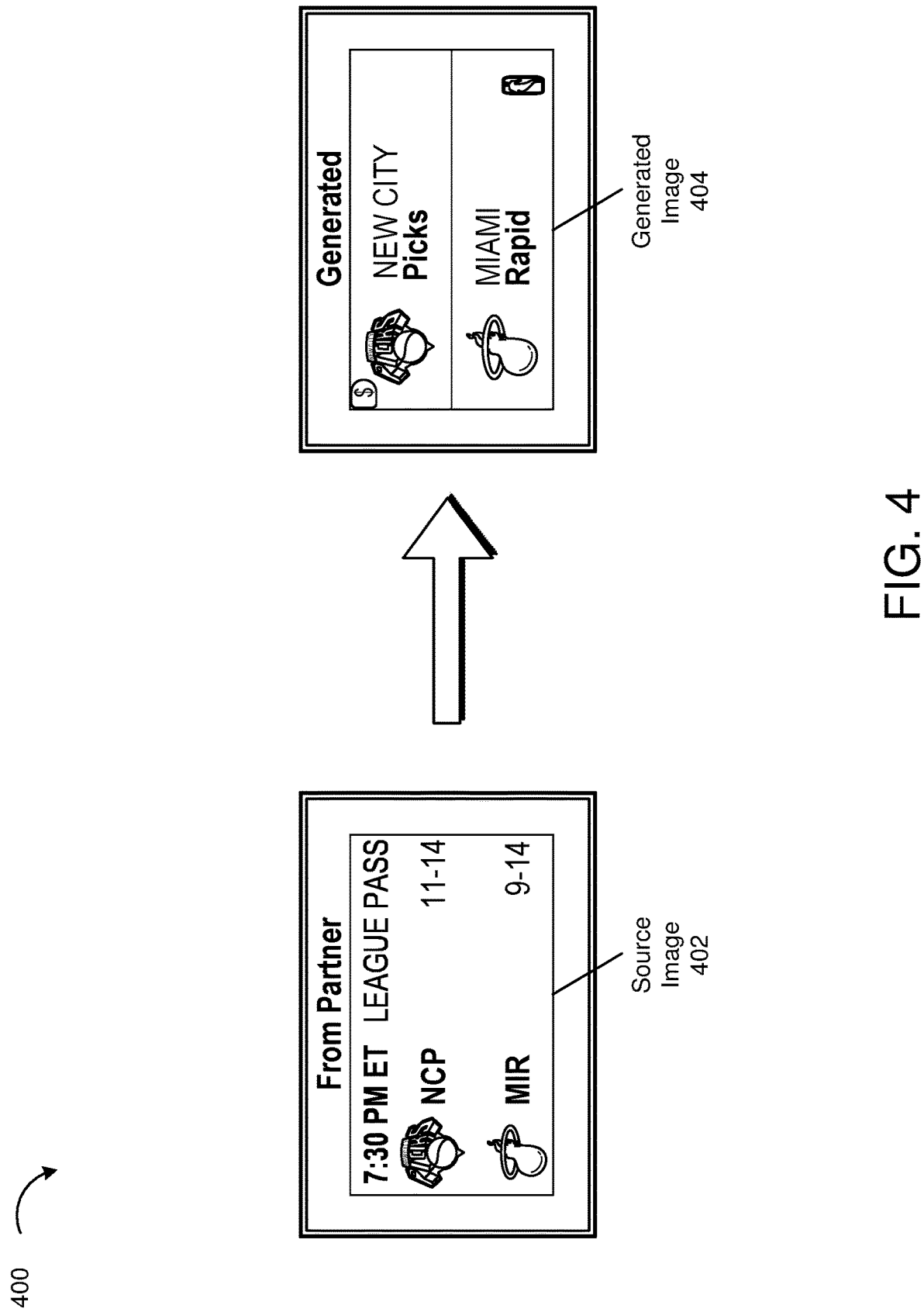
FIG. 4 illustrates a computing environment in which a source image is modified to create a generated image in a different format, in accordance with one or more example embodiments of the present disclosure.

FIG. 4 illustrates a computing environment 400 in which a source image is modified to create a generated image in a different format, in accordance with one or more example embodiments of the present disclosure. In at least one embodiment, a multimedia service provider obtains a source image 402 in one format and uses a different format to create a generated image 404. Techniques described in connection with FIG. 1 and FIG. 2 may be utilized in embodiments described in connection with FIG. 4. FIG. 4 may be implemented in the context of a multimedia service provider or any other suitable computer system.

Source image 402 may be converted from one format to another format for various reasons. For example, metrics may be used to determine how well a particular template for a box score is performing, and updating the format for how the box score is displayed may result in a large number of already generated box score images to be updated.

Source image 402 may refer to an image that is received, retrieved, or otherwise obtained. The source image 402 may be obtained by a multimedia service provider that is generating an overlay for content. Source image 402 may refer to an image that was obtained from a partner that may not be suitable, in its entirety, for presentation by the multimedia service provider, but may augmented with other available assets to create generated image 404.

In some embodiments, source image 402 is analyzed—for example, using a residual network such as ResNet-101, to obtain extracted features. The extracted features may be classified using a k-NN classifier or any suitable classification model. Assets may refer to a database that includes additional assets which are needed to create generated image 404, for example, according to an event template indicating that the league logo and team name/city text should be spelled out, if possible, and so on. Selected assets may be obtained from assets based on metadata indicating that they are suitable for use in generated image 404. In at least one embodiment, when a system extracts features, it detects that the text "NCP" and "MIR" are not suitable for the generated image and that, instead of the team initials, the name of the teams should be spelled out. The team initials "NCP" and "MIR" may be used in an asset search to find the corresponding team names from assets, and selected assets may include the team text "NEW CITY Picks" and "MIAMI Rapid" as desired for the generated image 404.

In some embodiments, a system performing a process to generate an image from a template may detect that, for an element of the template, that the corresponding asset is missing, and then attempt to obtain a suitable asset from another source, such as a partner's data store. Source image 402 from the partner may be analyzed to determine that it includes a suitable asset for the image being generated and that asset may be extracted from source image 402 and then used to create generated image 404.

In some embodiments, source image 402 is analyzed to determine a template for source image 402. For example, a residual network may be used to identify various elements of a template such as their boundaries and locations. Then, each image may be analyzed using a classifier to determine metadata for the various elements. A second template that is used to create generated image 404 may include various elements that re-use assets from source image 402. For example, the logos in source image 402 may be re-used in generated image 404.

Figure 5:
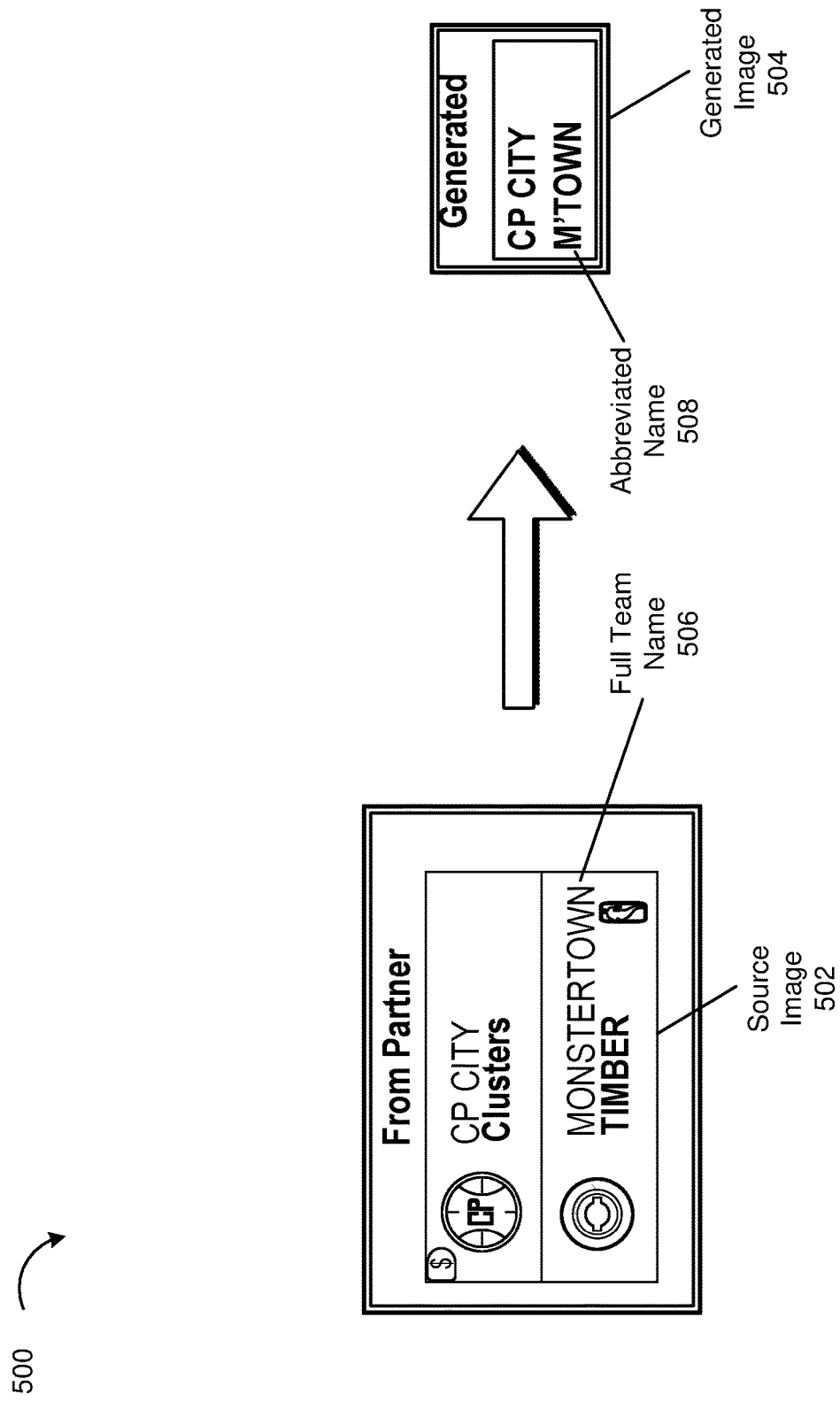
FIG. 5 illustrates a computing environment in which various aspects of a source image are transformed to accommodate a generated image, in accordance with one or more example embodiments of the present disclosure.

FIG. 5 illustrates a computing environment 500 in which various aspects of a source image are transformed to accommodate a generated image, in accordance with one or more example embodiments of the present disclosure. In at least one embodiment, a multimedia service provider obtains a source image 502 and various aspects of the source image are transformed to accommodate a generated image 504. Techniques described in connection with FIG. 1 and FIG. 2 may be utilized in embodiments described in connection with FIG. 5. FIG. 5 may be implemented in the context of a multimedia service provider or any other suitable computer system.

Source image 502 may be in accordance with other source images described in this disclosure, such as those discussed in connection with FIG. 1. In some embodiments, source image 502 is a box score image that is suitable for display on televisions and other multimedia devices with larger screens, whereas generated image 504 may be a box score that is being generated for tablets, smartphones, and other devices that may have smaller screens where source image 502 is not appropriate for display. In various embodiments, generated image 504 is smaller in size, either in terms of pixels or relative size from a viewer's perspective, than source image 502. In various embodiments, generated image 504 may be created based on an event template that specifies font sizes and maximum width for various elements such as the team names.

For example, note that in FIG. 5, full team name 506 is spelled out in full as "MONSTERTOWN" in source image 502 and abbreviated name 508 is spelled as "M'TOWN" in generated image 504. This may be due to the size of the generated image 504 being smaller than source image 502, resulting in less space being available to display the name. In various embodiments, a template specifies various properties for a text-based element, such as the region of the screen that the text is allowed to occupy, the font size, formatting, etc. and when a system attempts to create an image such as generated image 504 based on the template, it may determine whether the full team name 506 may be shown. If not, perhaps because including the full team name 506 would exceed the allowed region which the team text is allowed to occupy, then the template element may specify a fallback value, such as abbreviated name 508 or an even shorter text string (e.g., team initials) that should be used if full team name 506 violates one or more formatting rules for an element and/or template. Accordingly, as illustrated in FIG. 5, abbreviated names may be used for "COMPTON CITY" and "MONSTERTOWN" so that the team names fit within the dimensions of generated image 504.

Figure 6:
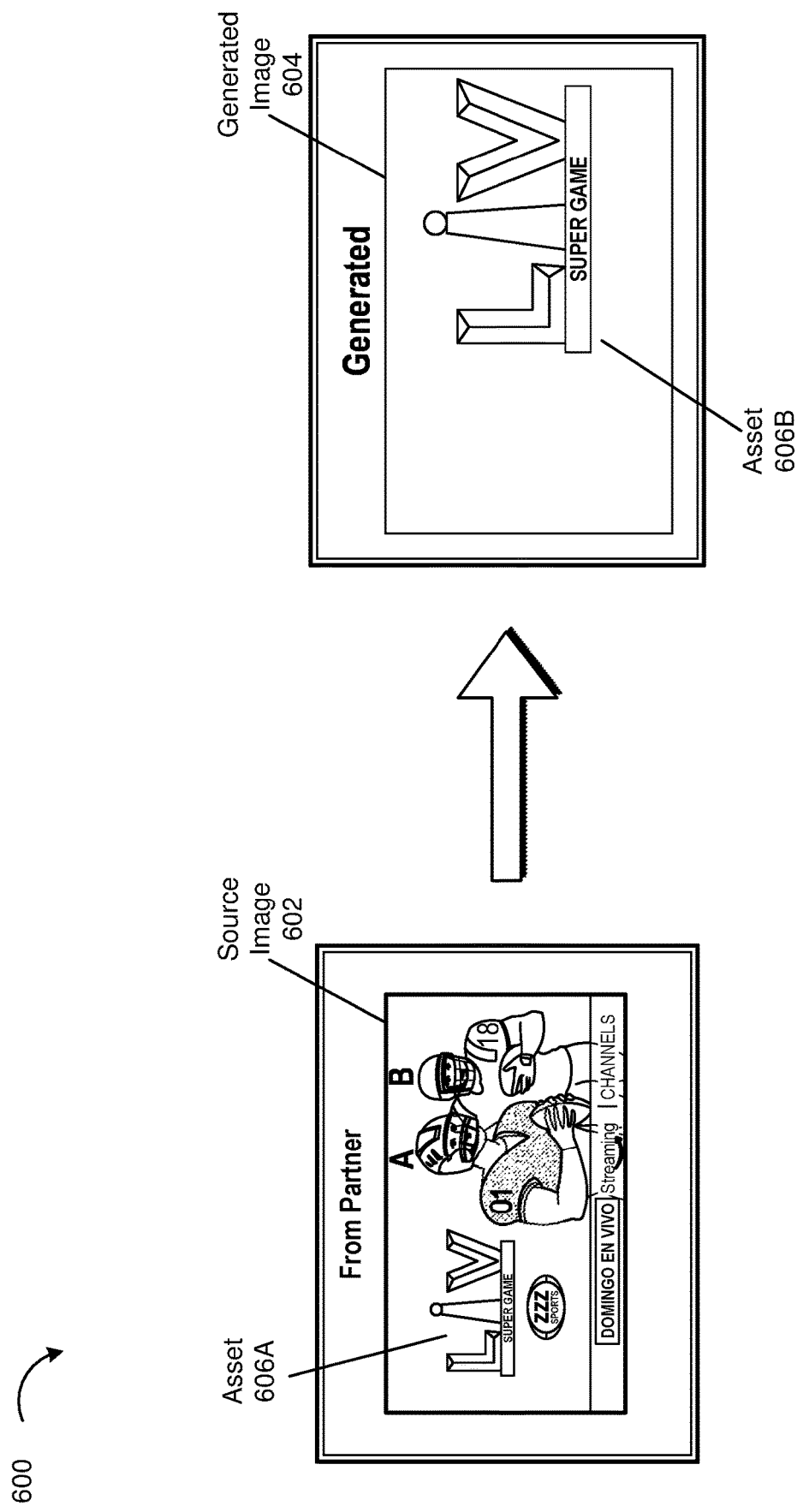
FIG. 6 illustrates a computing environment in which various aspects of a source image are transformed to extract assets from a source image for use in a generated image, in accordance with one or more example embodiments of the present disclosure

FIG. 6 illustrates a computing environment 600 in which various aspects of a source image are transformed to extract assets from a source image 602 for use in a generated image 604, in accordance with one or more example embodiments of the present disclosure. In at least one embodiment, a multimedia service provider obtains a source image 602 and exports various assets 606A for use in a generated image 604. Techniques described in connection with FIG. 1 and FIG. 2 may be utilized in embodiments described in connection with FIG. 6. FIG. 6 may be implemented in the context of a multimedia service provider or any other suitable computer system.

Source image 602 may be in accordance with those discussed elsewhere in this disclosure, such as those discussed in connection with FIG. 1. Source image 602 may include various features, which may be detected and extracted using a residual network such as ResNet-101. In various embodiments, asset 606A is extracted from a source image 602 and imported into generated image 604. FIG. 6 depicts an illustrative example where a graphic for "Super Game LV" is extracted from source image 602. Asset 606A may be an image asset and may be upscaled to produce asset 606B that is used in generated image 604. In various embodiments, asset 606A is exported from source image 602 to an asset store (e.g., database). A template may indicate that a "Super Game LV" logo is needed for an image being generated and a copy of the asset stored in the asset store may be retrieved and then upscaled to match a desired solution indicated in the template. In some embodiments, the upscaling may not be necessary as the resolution of the asset may match the resolution specified in the template. Asset 606B may be placed at any suitable region of generated image 604, other assets may be overlayed over or underneath asset 606B, and so on. For example, generated image 604 may include asset images for other players than those depicted in source image 602. User preference data may be used in the selection process that determines which players to depict in a generated image.

As is apparent from this discussion of FIG. 6 and elsewhere, many different types of images may be generated in this manner to create a wide variety of customized content. For example, generated image 604 may include additional template elements for football players in generated image 604 (not shown in FIG. 6).

Figure 7:
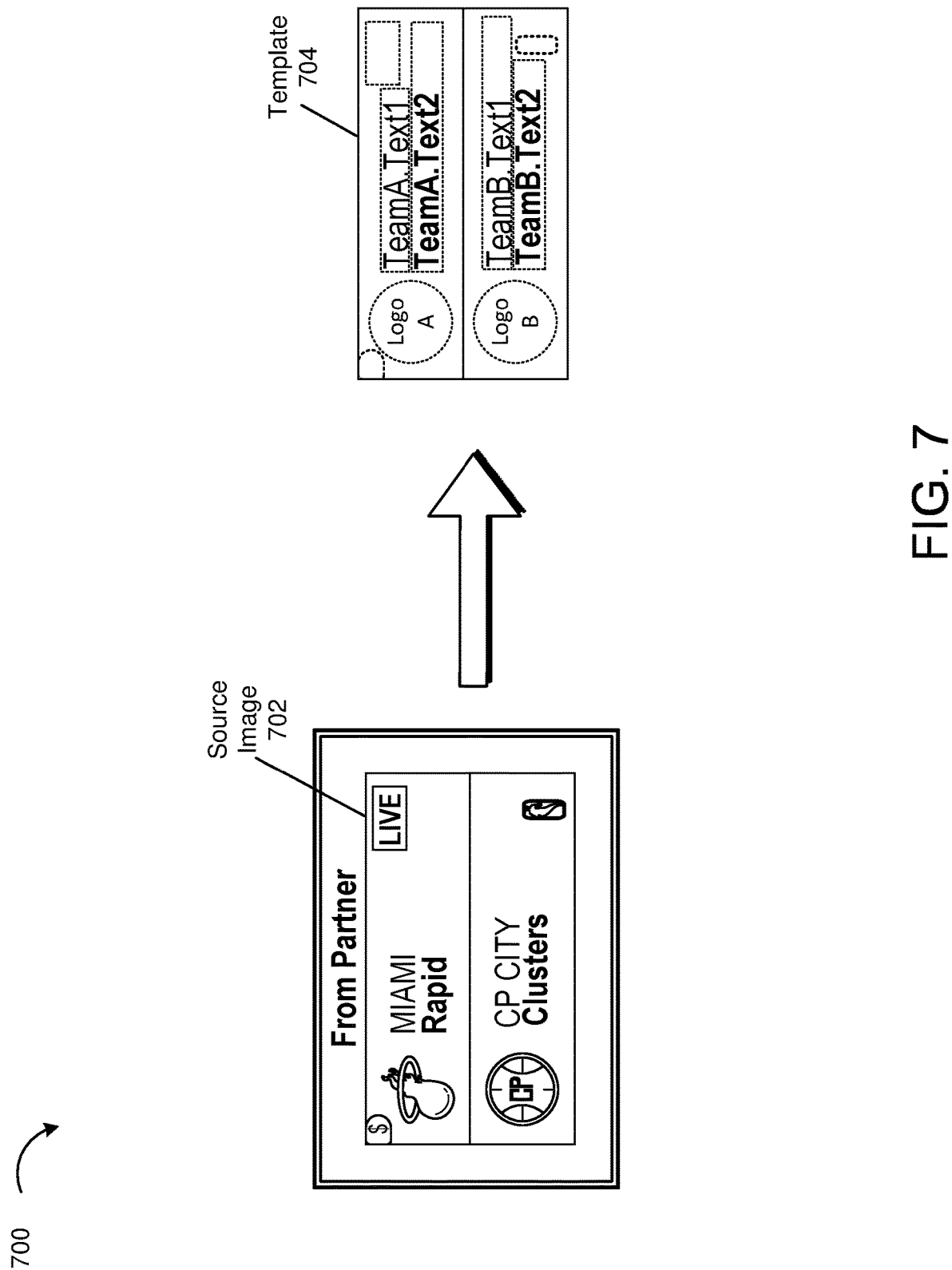
FIG. 7 illustrates a computing environment in which a template is determined from a source image, in accordance with one or more example embodiments of the present disclosure

FIG. 7 illustrates a computing environment 700 in which a template is determined from a source image, in accordance with one or more example embodiments of the present disclosure. In at least one embodiment, a multimedia service provider reverse engineers an event template from a source image. In various embodiments, images received from partners may not include information regarding the structure of an image. Determining a template may be useful for determining how to generate additional images with similar visual appearance to those provided by a partner. For example, a partner may provide a box score image for one pair of teams and box score images for other pairs of teams may be generated to have the same look and feel. Techniques described in connection with FIG. 1 and FIG. 2 may be utilized in embodiments described in connection with FIG. 7. FIG. 7 may be implemented in the context of a multimedia service provider or any other suitable computer system.

Source image 702 may be in accordance with those described elsewhere in this disclosure, such as those discussed in connection with FIG. 1 and FIG. 6. A recurrent neural network such as ResNet-101 may be utilized to perform feature detection and boundary detection of the detected features.

Feature boundaries may refer to the result of boundary detection on source image 702. Feature boundaries may include regions of source image 702 and may be of any shape and size. A feature boundary may have empty portions—for example, an image containing a donut may detect the boundary of the donut as including both an outer concentric circle and inner concentric circle, with the feature being identified as being the region of the image that is between the two concentric circles and not including portions of the image outside of the outer concentric circle and inside the inner concentric circle.

Feature boundaries may be utilized to determine the location and size of various elements for template 704 that is determined from source image 702. For example, source image 702 may be provided as an input to a neural network that performs feature detection and boundary detection to determine the boundary of various elements, which may be represented as the dotted lines depicted in template 704. Feature boundaries may be smoothed to have a more uniform shape. For example, various multi-sided shapes may have their boundaries approximated by circles, squares, rectangles, etc. This information may be encoded in a template as an element position (e.g., in the form of x and y coordinates) and a shape.

In various embodiments, features are extracted from source image 702 to determine elements for template 704 and then metadata for the features are encoded as metadata for template 704. For example, template 704 may include various elements, such as an element that corresponds to "Logo A" and two lines of text for Team A and the same for Team B. In some cases, a classification model determines more specific information so that the template encodes specific metadata from source image 702 in template 704, such as "Miami Rapid Logo" rather than a generic "Team A" logo. While a specific template may encode more precise information, a more generic template may be more useful, for example, because it may be generalized and used to create images for other pairs of teams.

Feature boundaries may be used for various purposes. For example, feature boundaries may be used to determine how much room is available in a banner to display text. For example, "LIVE" in English may be translated as "EN VIVO" in Spanish. Feature boundaries may be used to programmatically and automatically determine a suitable Spanish localization of source image 702, for example, by performing object identification on the banner, determining that it is in English, and determining a Spanish localization. However, localization into other languages may involve translated texts that are longer. This may result in a reduction in the text size so that the translated text fits into the frame for the text.

In some embodiments, templates can define dynamic behavior. For example, a template may encode conditional logic for how elements interact with each other. In one such embodiment, a preview image for a basketball game may include two overlapping elements to showcase players from both teams playing in the game; a template may encode logic to determine a favorability score for the first team and/or players of the first team and also for the second team and/or players of the second team. The player or team with the highest favorability score may be overlayed above the other team/player so as to be featured more prominently. Favorability scores may differ from user to user. For example, for a user that is a fan of the New City Picks, a Picks player may be featured more prominently and overlayed on top of the player of their opponent. As a second example, if another user is a fan of the Picks and more specifically a fan of a specific player on the team Boke Brian, then an image of Boke Brian may be selected in particular for the second user.

Figure 8:
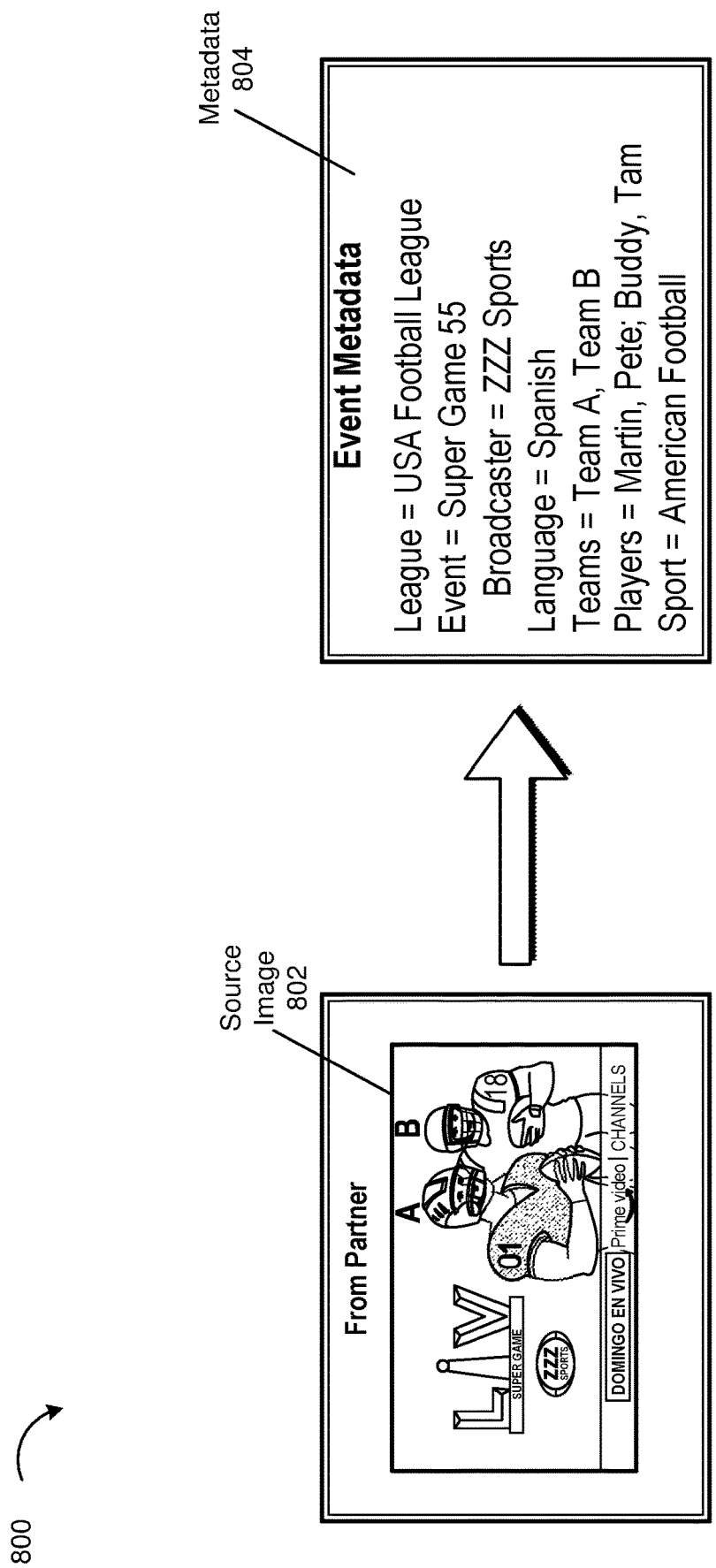
FIG. 8 illustrates a computing environment in which metadata is determined from a source image, in accordance with one or more example embodiments of the present disclosure

FIG. 8 illustrates a computing environment 800 in which metadata is determined from a source image, in accordance with one or more example embodiments of the present disclosure. In at least one embodiment, a multimedia service provider analyzes a source image 802 and determines metadata 804 for the image. Techniques described in connection with FIG. 1 and FIG. 2 may be utilized in embodiments described in connection with FIG. 8. FIG. 8 may be implemented in the context of a multimedia service provider or any other suitable computer system.

For a source image 802, metadata may be determined for the image as a whole, as well as for various features that are detected and extracted, according to at least one embodiment. Source image 802 may be used to determine image-level metadata 804. Source image 802 may be provided to a feature extraction component, such as a residual network, to determine a set of features. Features of the image may be provided to a classifier such as a K-NN classifier to determine metadata, such as the names of players in various extracted features, the teams they play on, and more. In various embodiments, network-connected resources are utilized to determine some of the metadata. For example, if the jersey number and name of a team is recognized in an image, a sports database accessible via the Internet may be queried to determine the name of the player. As a second example, an image may include features that identify a particular event, such as the Super Bowl, and the location of the event may be queried via the Internet and then included in the event metadata. Metadata 804 may include various information that can be identified using source image 802 (e.g., in conjunction with network-connected data sources) such as the name of the event, the broadcaster, the names of players that are depicted in the image, their teams, what language the image is displayed in, the sport, as well as the league (e.g., which can be determined based on the event or teams). These are merely illustrative examples of metadata that can be extracted from source image 802 and are not intended to be limiting.

In various embodiments, image processing techniques described herein may be utilized to dynamically alter the presentation of assets within an image based on user preferences. The presentation of various elements within an image may be customized based on user-specific information such as who their favorite players or favorite teams are. For example, as depicted in FIG. 8, metadata 804 may be extracted (e.g., as described above) to determine that Team A and Team B are playing in Super Game 55. If user-specific preference information indicates that a particular user has a preference for Team B, source image 802 may be altered to have the player from Team B overlayed above the player from Team A or otherwise featured more prominently. A preference for Team B may be determined by a user "Liking" the team on social media, based on purchase history information of the user, the user's viewing history, and various other information sources that may indicate the user may respond more favorably to Team B than Team A.

Figure 9:
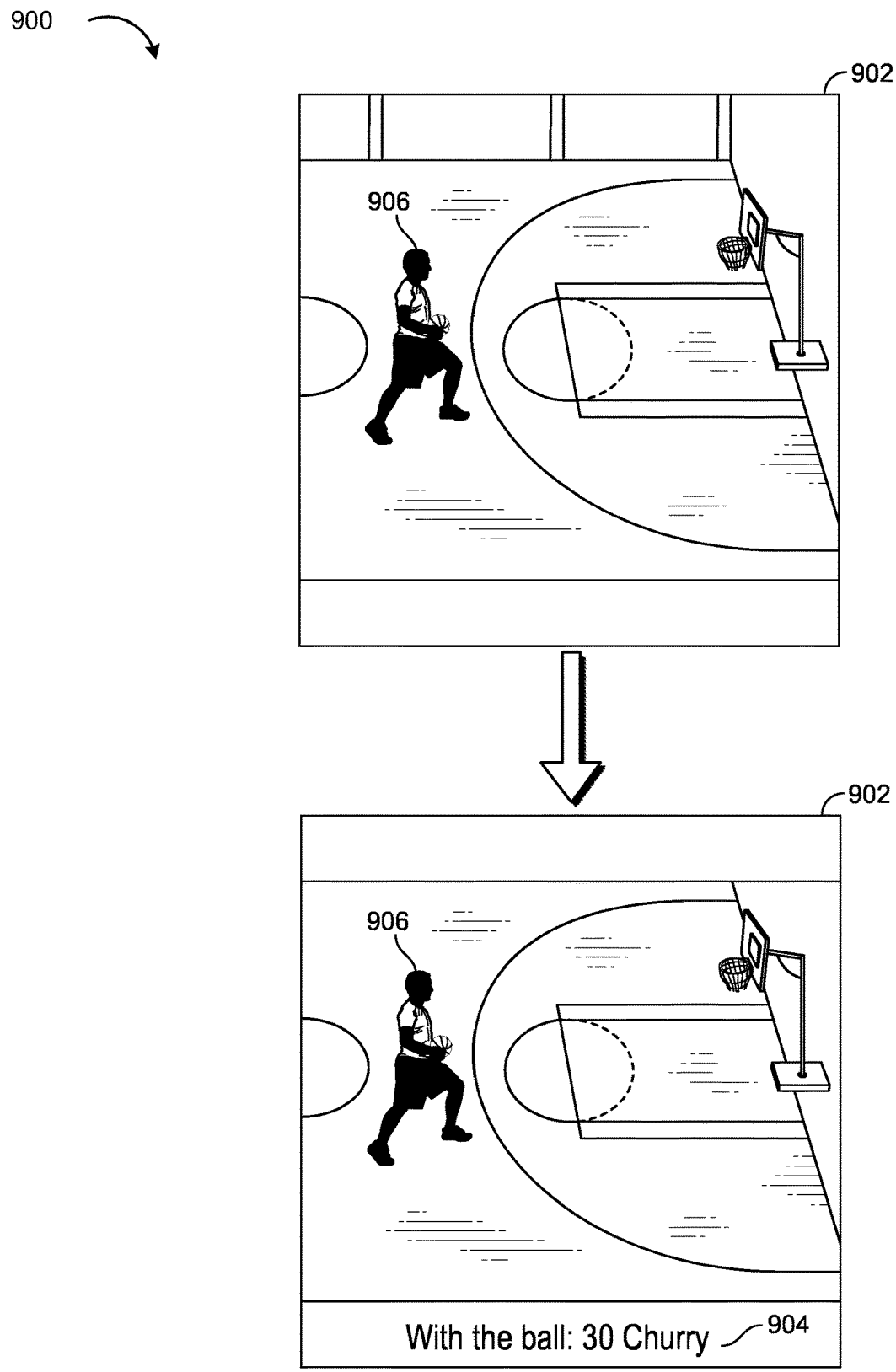
FIG. 9 illustrates a computing environment in which overlay content for a video stream is generated, in accordance with one or more example embodiments of the present disclosure

FIG. 9 illustrates a computing environment 900 in which overlay content for a video stream is generated, in accordance with one or more example embodiments of the present disclosure. In at least one embodiment, a multimedia service provider analyzes a video stream to determine metadata for the video and generates additional content. Techniques described in connection with FIG. 1 and FIG. 2 may be utilized in embodiments described in connection with FIG. 9. FIG. 9 may be implemented in the context of a multimedia service provider or any other suitable computer system.

A multimedia service provider may refer to one or more servers that provides multimedia services, which may include a content delivery network. Multimedia service may receive a source video stream and then provide that source video stream to users of the multimedia service that may consume the contents of the source video stream in various formats and languages. For example, a multimedia source may be transcoded into several different formats (e.g., resolutions, aspect ratios) for viewing on different types of devices.

In at least one embodiment, a multimedia service provider generates additional content to overlay on a video stream to provide a better viewing experience. In some embodiments, the additional content may be generated and presented as an overlay in response to user action, for example, a user selecting an enhanced mode of presentation. In some embodiments, the additional content is used to create a translated video stream that may be performed based on a viewer's language that is different from the language of a source video stream.

FIG. 9 depicts, in accordance with at least one embodiment, generating real-time contextual content for a video stream. Video stream 902 may be a source video stream, transcoded version thereof, or other suitable multimedia FIG. 9 may depict a single frame of a video stream, in accordance with at least one embodiment. Video stream 902 may be processed by a server (e.g., multimedia service provider) or a client (e.g., a client computing device) to generate contextual content 904. In at least one embodiment, a suitable computing entity receives one or more frames of video stream 902 and uses a feature extraction component such as ResNet-101 to extract features of the scene. Various features may be extracted and provided to a classifier such as a k-NN classifier to determine metadata about the frame. For example, in a first frame of video stream 902 shown in FIG. 9, a set of features may be extracted where various players visible in the scene are extracted as separate features. In some cases, players may be partially or fully occluded in a scene. Features may be provided to a classification model that determines which players are in the scene and various metadata related to those players. For example, player 906 may be extracted as a feature from video stream 902. The jersey number of player 906 may be visible in the capture frame of the video stream, and may be used to identify the feature as a particular player, such as "Churry" as seen in FIG. 9. Additional metadata that may be determined include that player 906 is holding a basketball (note that this determination may be possible even when the ball is partially occluded). Metadata determined from the frame may be used to generate contextual content 904. As seen in FIG. 9, the contextual content may be generated from the metadata to provide a narration of the game, for example, describing that "30 Churry" (referring to player 906) has possession of the ball. At a subsequent point in time, the video stream may depict the player 906 passing the ball to another player, which may generate additional contextual comments such as "30 Churry passed the ball to 23 Greene" then "23 Greene attempted 3-point shot" then "23 Greene attempted 3-point shot (missed)" and so on to provide play-by-play narration of the video stream. The contextual content 904 may displayed in a lower-third portion of the video stream 902. Lower-thirds may refer to a portion of a video stream in sports, media, etc. that is typically used to display contextual information for a video program being shown.

In some embodiments, video stream 902 is used to determine which players are on the court and then provide real-time stats for those players. For example, frames of video stream 902 may be monitored to identify a suitable frame for player identification. A suitable frame for player identification may be a frame in which all players are visible. In some cases, players may be partially occluded in a suitable frame, such as where players' jerseys and/or names are visible. From the suitable frame, features may be extracted for each players and then provided a classification or identification component that determines the identity of the players. In some embodiments, real-time statistics (e.g., game statistics) for the players may be generated and cached, to be displayed at an appropriate point in time, such as when there is a lull in activity between free throws, etc. In some embodiments, once the players on the court have been identified, an object tracking component tracks the movement of the players and determines whether the same players stay on the court or leave the court via substitution. Statistics for a set of players may be updated when players enter or leave the court.

Figure 10:
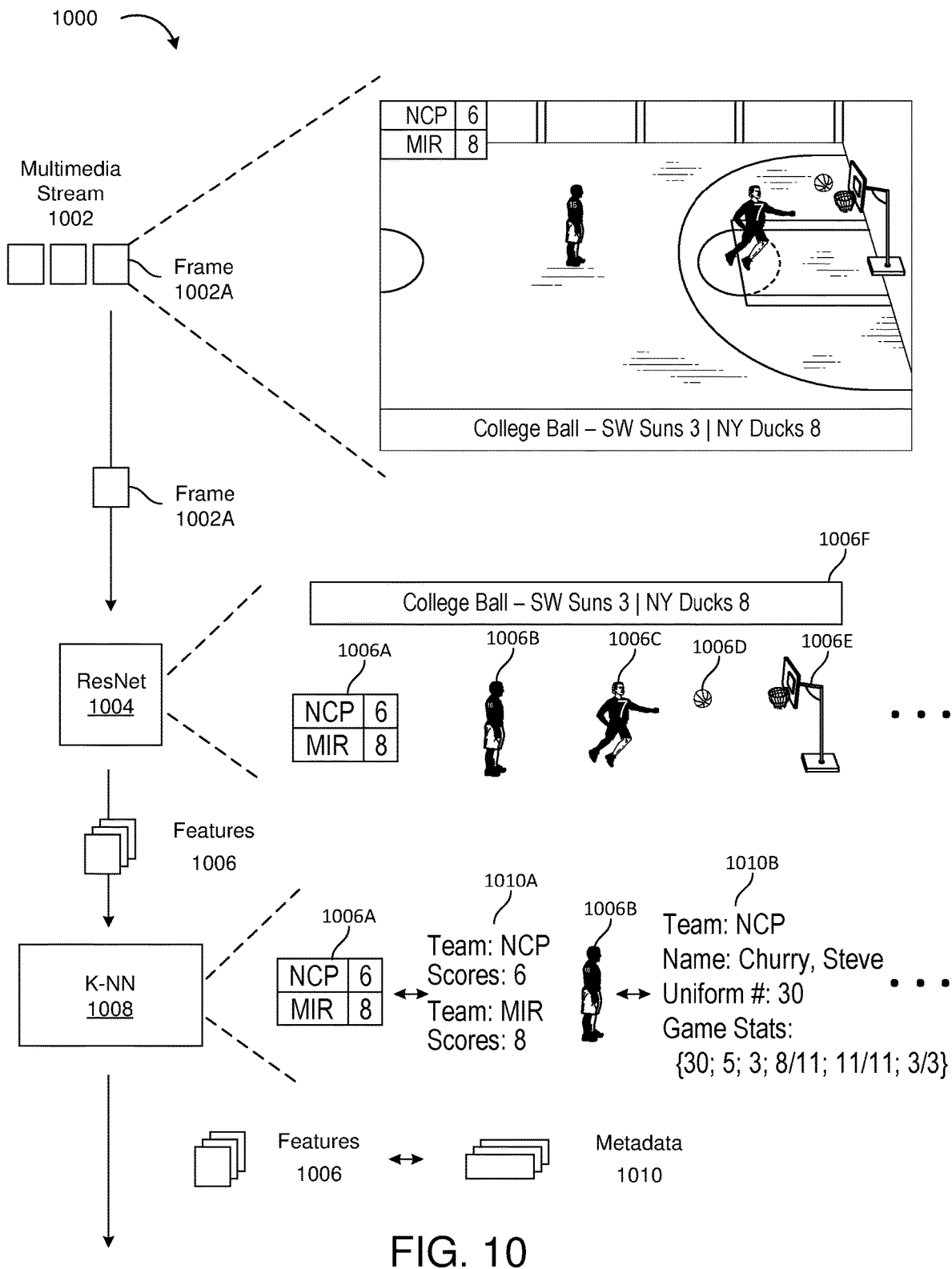
FIG. 10 illustrates a computing environment in which overlay content for a video stream is generated, in accordance with one or more example embodiments of the present disclosure

FIG. 10 illustrates a computing environment 1000 in which overlay content for a video stream is generated, in accordance with one or more example embodiments of the present disclosure. In at least one embodiment, a multimedia service provider analyzes a video stream to determine metadata for the video and generates additional content. Techniques described in connection with FIG. 1 and FIG. 2 may be utilized in embodiments described in connection with FIG. 10. FIG. 10 may be implemented in the context of a multimedia service provider or any other suitable computer system.

In various embodiments, a system such as a multimedia service provider may retrieve, receive, or otherwise obtain a multimedia stream 1002. Multimedia stream 1002 may be a multimedia stream of content according to any suitable format or encoding, for example, using the H.264 video compression standard. Multimedia stream 1002 may comprise video and audio data. The video portion of a multimedia stream may comprise a set of frames. A frame 1002A of multimedia stream 1002 may be transmitted to a viewing device to be displayed at the viewing device according to a desired frame rate. For example, for a target frame rate of 60 frames per second, frame 1002A may be shown to a user for $\frac{1}{60}^{th}$ of a second, and then the next frame is shown for $\frac{1}{60}^{th}$ of a second, and so on. In some cases, multimedia stream may comprise key frames that define the starting and/or ending point of a sequence of frames. Frame 1002A depicted in FIG. 1 may, in some embodiments, be a key frame that is selected for processing to determine feature and metadata information of the multimedia stream 1002, as described in greater detail below.

In some embodiments, a multimedia service selects or otherwise obtains frame 1002A of multimedia stream 1002 and provides it as an input to a feature extraction component such as a residual network. ResNet 1004 may refer to an example of a feature extraction component that can be utilized to determine features 1006. ResNet 1004 may refer to ResNet-101 or various other residual networks that can be used to perform feature extraction. In various embodiments, features ResNet 1004 extracts features 1006 from frame 1002A. For example, features such as a box score 1006A with the current game score, a first player 1006B, a second player 1006C, a basketball 1006D, a basketball hoop 1006E, and an overlay 1006F with score update for other game(s). While FIG. 10 depicts one illustrative example of a portion of a set of features that may be extracted using ResNet 1004, other sets of features may be extracted as well. Each feature may be extracted as a grouping of pixels, without any additional contextual information or metadata of what the grouping of pixels represents.

K-nearest neighbors (K-NN) 1008 may refer to a classifier model that receives features 1006 as inputs and determines metadata about each of the features 1006. In some cases, additional information, such as the entire frame 1002A may be provided to K-NN to perform classification about the entire scene rather than the individual features in isolation. In various embodiments, K-NN 1008 determines corresponding metadata 1010 for features 1006. For example, 1006A depicts a box score with two teams and their current scores. Metadata 1010A may determine a structure with data describing information encoded in features 1006A. For example, metadata 1010A may encode the names of the teams that are playing and their scores. As a second example, K-NN 1008 may identify that feature 1006B is a basketball player and more specifically that it depicts a specific basketball player, "Steve Churry," who wears jersey #30 on the New City Picks (NCP) team. This information may be stored in corresponding metadata 1010B. Furthermore, in some embodiments, frame 1002A and/or multimedia stream 1002 may be used to determine additional contextual information to include in metadata 1010B. For example, K-NN 1008 may determine that frame 1002A depicts a live event basketball game and obtain, from a sports statistics provider, real-time game stats and include the stats in the metadata 1010B. The metadata may be timestamped to indicate when the current game stats are valid (e.g., invalidated when the player scores more points). Metadata may be generated for other features based on the techniques described herein.

Figure 11:
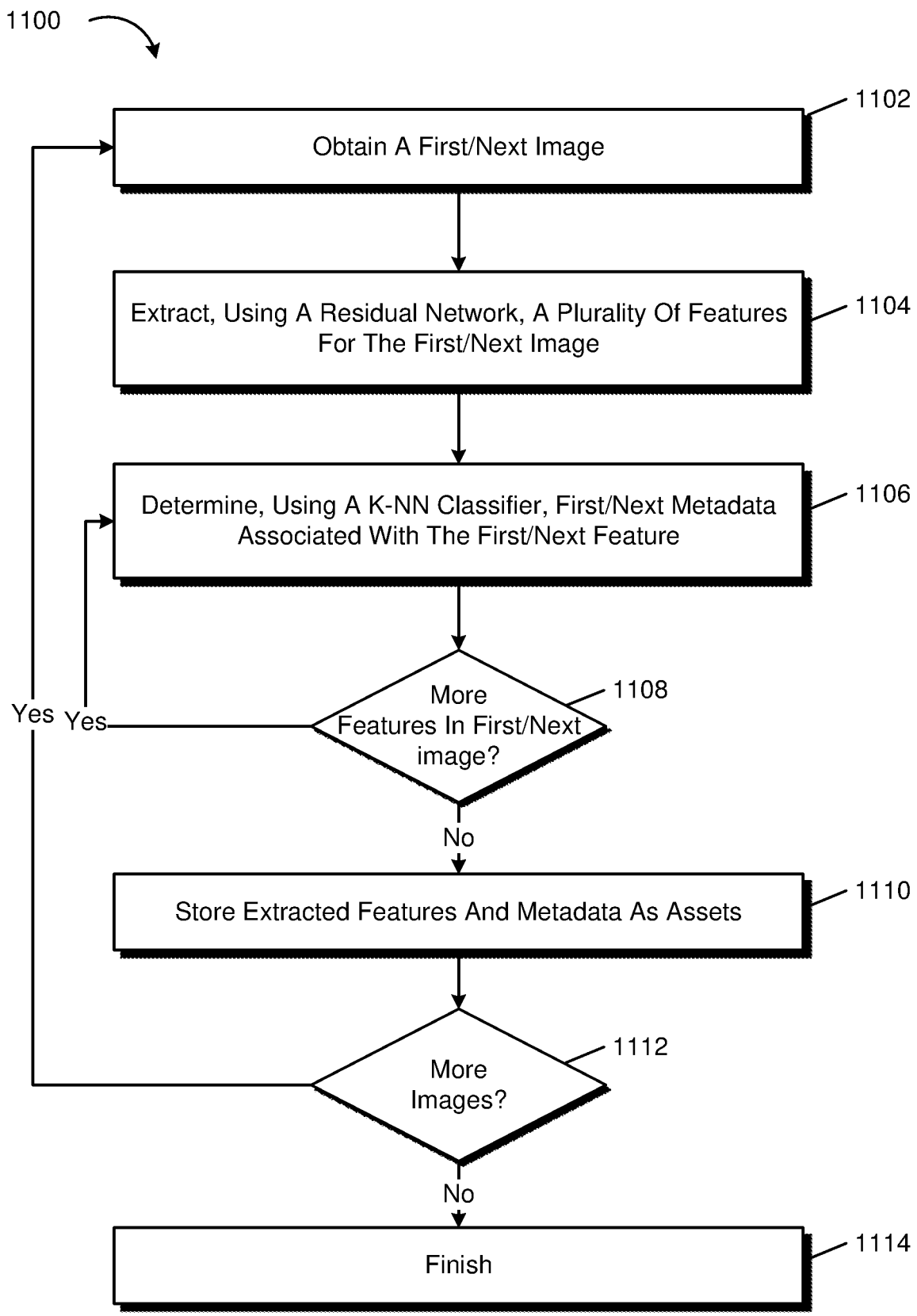
FIG. 11 shows an illustrative example of a process for extracting assets from an image, in accordance with one or more example embodiments of the present disclosure.

FIG. 11 shows an illustrative example of a process 1100 for extracting assets from an image, in accordance with one or more example embodiments of the present disclosure. In at least one embodiment, some or all of the process 1100 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 1100 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 1100 may be implemented in the context of various systems and methods described elsewhere in this disclosure, such as those discussed in connection with FIGS. 1-10 and 12-14. In at least one embodiment, process 1100 or a portion thereof is implemented by a computing resource service provider.

Process 1100 may comprise a step to obtain 1102 a first image. An image may be obtained in any suitable manner, such as by extracting a frame from a multimedia stream. An image may be retrieved or received from a partner organization by downloading image data over a network such as the Internet. The process may also comprise a step to extract 1104 a plurality of features for the first image. Features of an image may be determined using a residual neural network such as ResNet-101. Features may represent regions of interest in an image. The process may also comprise a step to determine 1106 metadata associated with the first feature. Metadata may refer to information relating to the specific feature or the specific feature in the context of the first image. For example, metadata for an image may include event information, language information, and more. The system may then determine whether 1108 more features are in the first image. If there is a second feature, then steps 1106 to 1108 may be repeated for the second feature, third feature, etc. of the first image until all features of the first image have been processed using the K-NN classifier. When all metadata and features of the first image are determined, they may the system may store 1110 the extracted features and metadata for the first image as image assets. Assets may refer to a feature extracted from an image as well as the corresponding metadata for the image. In some cases, the asset may refer simply to an extracted portion of an image for which metadata regarding what is included in the image is also available. The system may then determine whether 1112 there are more images. For example, several images may be received from a partner organization and processed in bulk. If there are more images, then the system may repeat steps 1102-1112 for the second image, third image, and so on, until all images have been processed. Once all images have been processed, the system may finish 1114 execution. Execution may simply terminate after the last image has been processed (e.g., making step 1114 a no-op). In some cases, execution of other steps, such as the generation of additional images based on the stored assets, may commence after completion.

Figure 12:
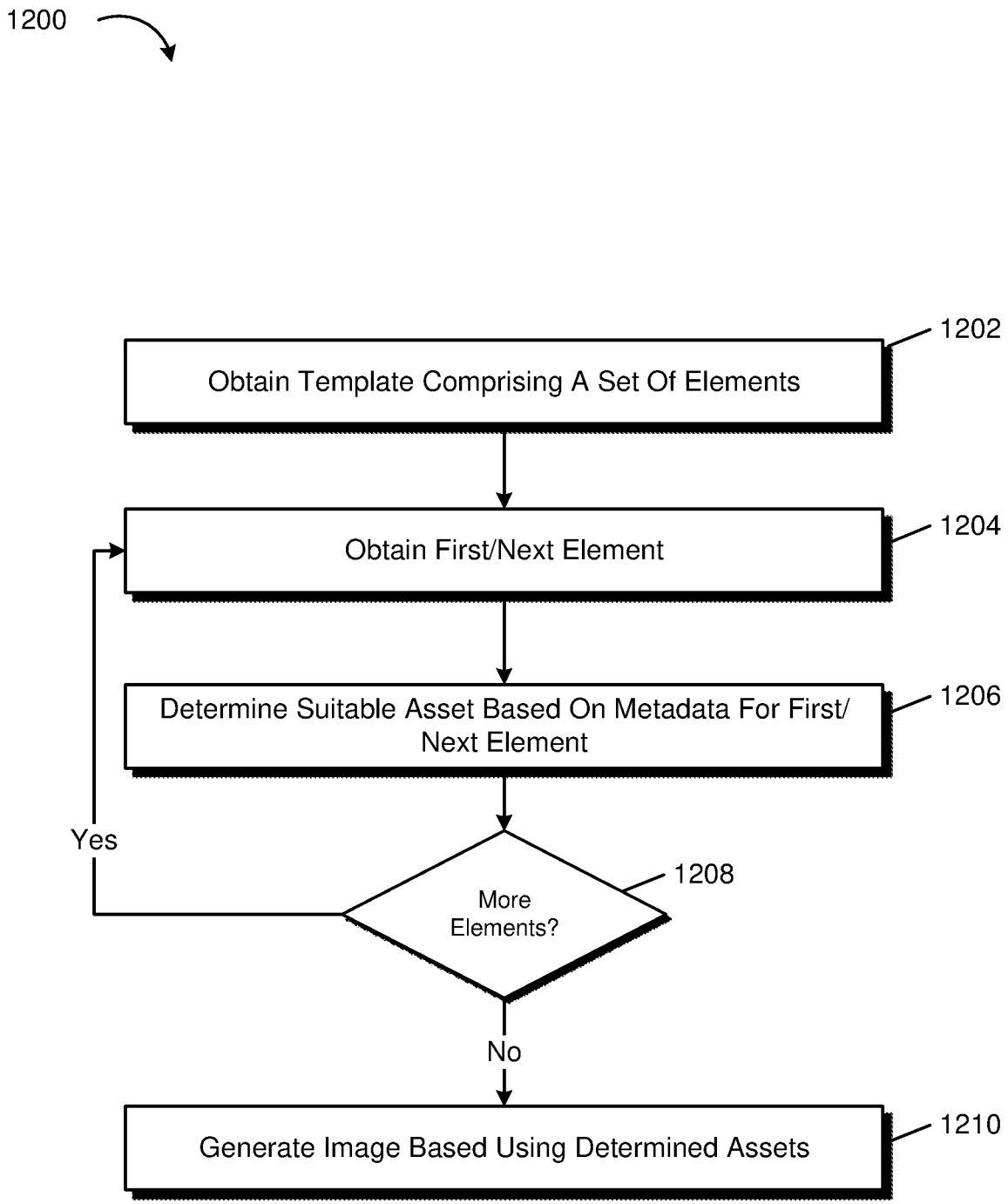
FIG. 12 shows an illustrative example of a process for using a template and image assets to generate an image, in accordance with one or more example embodiments of the present disclosure.

FIG. 12 shows an illustrative example of a process 1200 for using a template and image assets to generate an image, in accordance with one or more example embodiments of the present disclosure. In at least one embodiment, some or all of the process 1200 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 1200 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 1200 may be implemented in the context of various systems and methods described elsewhere in this disclosure, such as those discussed in connection with FIGS. 1-11, 13, and 14. In at least one embodiment, process 1100 or a portion thereof is implemented by a computing resource service provider.

Process 1200 may comprise a step to obtain 1202 a template comprising a set of elements. An element may include position data that indicates the x and y coordinates for an element, the boundaries of the element, rules of whether the element may overlap with other elements, and so on. An element may comprise metadata in the form of one or more properties, which may specify what content is to be generated as the element. The process may comprise a step to obtain 1204 a first element of the template. The template may be encoded in a human-readable format such as Java Script Object Notation (JSON) file that encodes the various rules and requirements for each element. The process may include a step where a system is to determine 1206 a suitable asset for the first element. In various embodiments, assets are stored in a database and metadata for such assets are searched to find an asset that matches metadata for the first element. For example, the metadata for an element may indicate that it is a logo for the Miami Rapid team. The system may search an assets database to find a logo image for the Miami Rapid team. The assets may comprise features extracted from other images. An alternate form of an asset may be used, in some embodiments. For example, if an element indicates that a logo image for the Miami Rapid team of a particular size is needed an assets database may be searched to find a logo that is larger than the specified size (e.g., because a logo of the exact size needed by the template does not exist in the asset database) and then downscaled to the particular size specified by the template. As a second example, text may have multiple forms, and an abbreviated form of a text string may be an alternate form of the text string that is suitable for use when the text string is too long to fit in the space allotted to the element. In various embodiments, the system determines whether 1208 the template has more elements. If there are second, third, etc. elements, then steps 1204-1206 may be performed for each element. Once all elements have been processed, the system may generate 1210 an image based on the assets that were selected or created for each element of the template.

Figure 13:
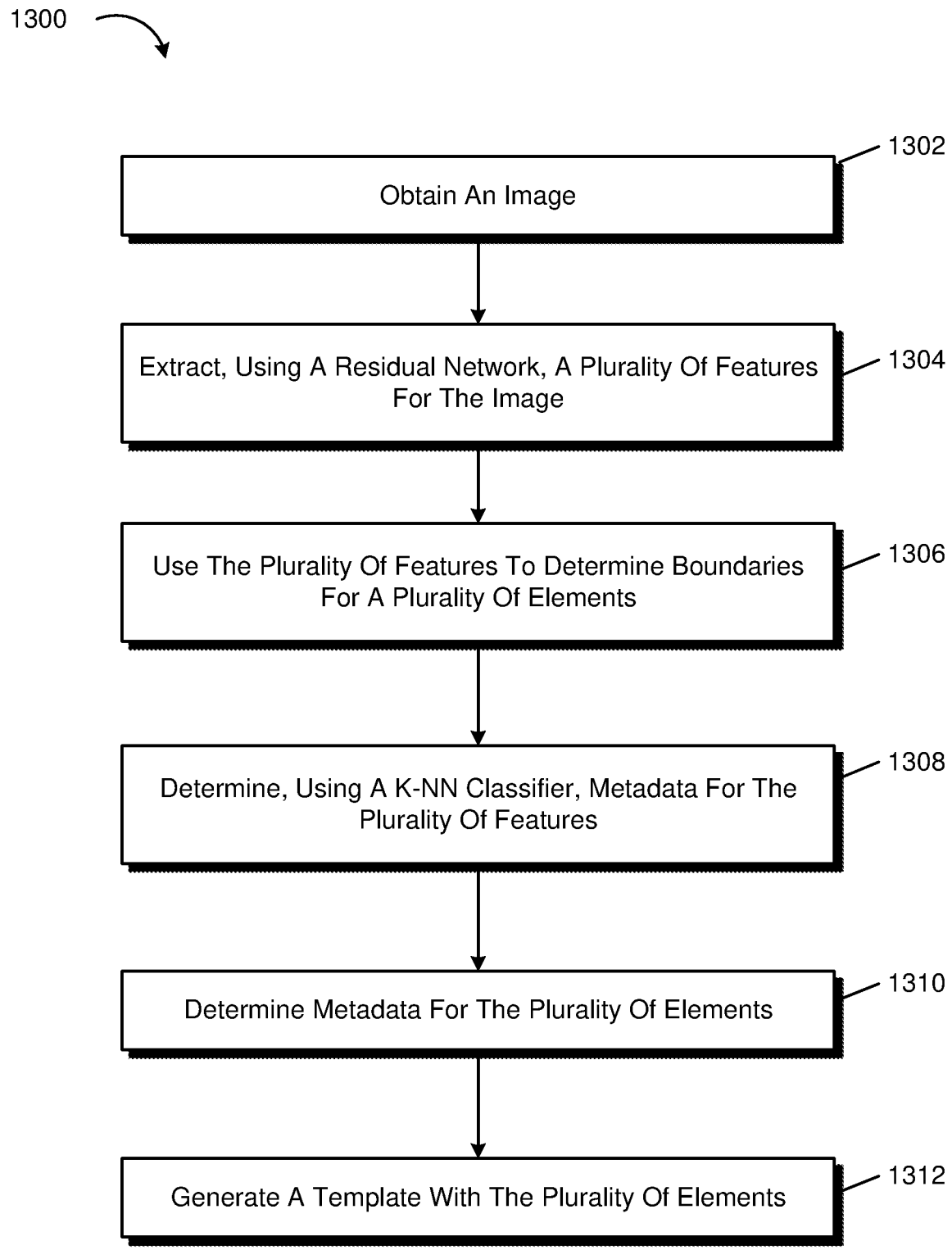
FIG. 13 shows an illustrative example of a process for generating a template from an image, in accordance with one or more example embodiments of the present disclosure.

FIG. 13 shows an illustrative example of a process 1300 for generating a template from an image, in accordance with one or more example embodiments of the present disclosure. In at least one embodiment, some or all of the process 1300 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 1300 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 1100 may be implemented in the context of various systems and methods described elsewhere in this disclosure, such as those discussed in connection with FIGS. 1-12 and 14. In at least one embodiment, process 1300 or a portion thereof is implemented by a computing resource service provider.

In at least one embodiment, process 1300 is performed by a system that performs a step to obtain 1302 an image. The image may be obtained in any suitable manner and may be selected by a user. The system may extract 1304, using a residual network such as ResNet-101, a plurality of features for the image. Features may have associated boundaries that specify portions of the image which for a logical unit. Accordingly, the system may use 1306 the plurality of features to determine boundaries for a plurality of elements. Determining boundaries for a plurality of elements may involve defining an element for each feature and then encoding the boundaries of each feature as the boundary of a corresponding element. In some cases, boundaries of elements are made to be of certain shapes or sizes, for example, circles and rectangles. The system may determine 1308, using a K-NN classifier, metadata for the plurality of features. For example, each feature may be provided as an input to a classification model to determine a set of parameters that encodes information about the feature. In some embodiments, the system determines 1310 metadata for the plurality of elements. Metadata may be determined from the K-NN classifier by may be generalized. For example, if a template is being extracted from the source image illustrated in FIG. 7, then the K-NN classifier may determine that one of the teams is Miami Rapid and then the information may be generalized to encode a placeholder Team A. The system may generate 1312 a template with the plurality of elements, for example, by creating a file in JSON format that encodes each feature of the image as a corresponding element.

The examples presented herein are not meant to be limiting.

Figure 14:
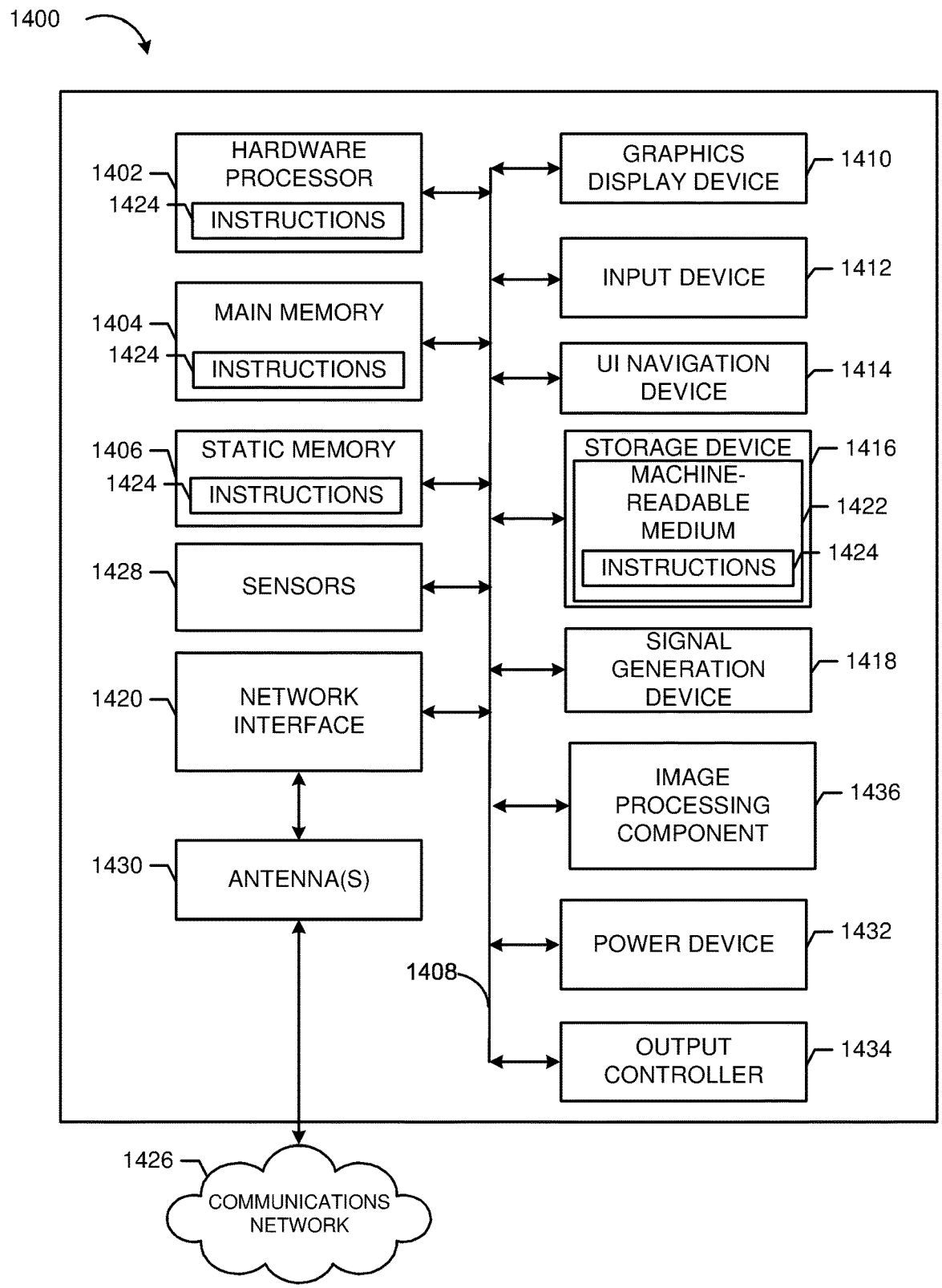
FIG. 14 illustrates a block diagram of an example machine upon which any of one or more techniques (e.g., methods) may be performed, in accordance with one or more example embodiments of the present disclosure.

FIG. 14 illustrates a block diagram of an example of a machine 1400 (e.g., implemented in whole or in part in the context of embodiments described in connection with other figures. In some embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in Wi-Fi direct, peer-to-peer (P2P) (or other distributed) network environments. The machine 1400 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module.

For example, under operation, the execution units may be configured by a first set of instructions to implement a first module at one point in time and reconfigured by a second set of instructions to implement a second module at a second point in time.

The machine (e.g., computer system) 1400 may include any combination of the illustrated components. For example, the machine 1400 may include a hardware processor 1402 (e.g., a central processing unit (CPU), a graphics processing unit (GPU), a hardware processor core, or any combination thereof), a main memory 1404 and a static memory 1406, some or all of which may communicate with each other via an interlink (e.g., bus) 1408. The machine 1400 may further include a power management device 1432, a graphics display device 1410, an alphanumeric input device 1412 (e.g., a keyboard), and a user interface (UI) navigation device 1414 (e.g., a mouse). In an example, the graphics display device 1410, alphanumeric input device 1412, and UI navigation device 1414 may be a touch screen display. The machine 1400 may additionally include a storage device (e.g., drive unit) 1416, a signal generation device 1418, and a network interface device/transceiver 1420 coupled to antenna(s) 1430. The machine 1400 may include an output controller 1434, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 1416 may include a machine readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within the static memory 1406, or within the hardware processor 1402 during execution thereof by the machine 1400. In an example, one or any combination of the hardware processor 1402, the main memory 1404, the static memory 1406, or the storage device 1416 may constitute machine-readable media.

While the machine-readable medium 1422 is illustrated as a single medium, the term "machine-readable medium" may include a single medium or multiple media (e.g., a centralized or distributed database, and/or associated caches and servers) configured to store the one or more instructions 1424.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1400 and that causes the machine 1400 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1424 may further be transmitted or received over a communications network 1426 using a transmission medium via the network interface device/transceiver 1420 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1420 may include one or more physical jacks (e.g., Ethernet, coaxial, or phone jacks) or one or more antennas to connect to the communications network 1426. In an example, the network interface device/transceiver 1420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1400 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

Image process component 1436 may refer to hardware, software, or a combination thereof that implements various techniques described above, such as those discussed in connection with FIGS. 1-13. For example, image processing component may be a software application that obtains an image, extracts a set of features from the image using a residual network, and determines metadata for the extracted features using a K-nearest neighbors classification model. In some embodiments, an asset database is populated using the extracted features and metadata. Image process component 1436 may use assets (e.g., in or accessible via a database) to generate images from templates, such as by using techniques described in connection with FIG. 2.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A computer-implemented method, comprising:
   obtaining a first image;
   extracting, using a residual network, a first plurality of features from the first image;
   determining, using a K-nearest neighbors (K-NN) classifier, first metadata associated with a first feature of the first plurality of features;
   obtaining a second image;
   extracting, using the residual network, a second plurality of features from the second image;
   determining, using the K-NN classifier, second metadata associated with a second feature of the second plurality of features;
   obtaining a template for a third image, wherein the templates comprises:
      a first element that encodes third metadata for first content to be generated at a first portion of the third image; and
      a second element that encodes fourth metadata for second content to be generated at a second portion of the third image;
   determining the first metadata matches the third metadata;
   determining the second metadata matches the fourth metadata; and
   generating the third image based on the template, wherein the first portion of the third image is generated based on the first feature and the second portion of the third image is generated based on the second feature.

2. The computer-implemented method of claim 1, wherein the first feature comprises pixels from a portion of the first image.

3. The computer-implemented method of claim 1, further comprising:
   storing, in a database, the first feature in association with the first metadata; and
   retrieving, from the database and based on a request to generate the third image, the first feature and the first metadata for generation of the third image.

4. The computer-implemented method of claim 1, wherein the residual network comprises ResNet-101.

5. A system, comprising:
   one or more processors; and
   memory storing executable instructions that, as a result of execution by the one or more processors, cause the system to:
      obtain a first image;
      determine, using one or more convolutional neural networks, a set of features in the first image;
      determine, using one or more classification models, a first set of properties for a first feature of the set of features;
      obtain a template for a second image, wherein the template comprises a first element and a second set of properties;
      determine, based on the first set of properties and the second set of properties, that the first feature is suitable to be used as the first element; and
      generate, based on the first feature, a portion of the second image.

6. The system of claim 5, wherein the executable instructions include further instructions that, as a result of execution by the one or more processors, further cause the system to:
   determine, using the one or more convolutional neural networks, a second feature in a third image;
   determine, using the one or more classification models, a third set of properties for the third image;
   determine, based on the third set of properties and a second element of the template, that the second feature is suitable for use as the second element; and
   generate, based on the second feature, a second portion of the second image.

7. The system of claim 5, wherein the executable instructions include further instructions that, as a result of execution by the one or more processors, further cause the system to:
   obtain a second element of the template, the second element comprising position data;
   determine, based on the position data, a size requirement;
   determine that a second feature of the set of features fails to meet the size requirement;
   determine an alternate form of the second feature that meets the size requirement; and
   generate, based on the alternate form of the second feature and the position data, a second portion of the second image.

8. The system of claim 5, wherein the first image is a frame of a multimedia stream.

9. The system of claim 5, wherein:
   the first set of properties comprises language information;
   the second set of properties comprises a language requirement; and
   the first feature is suitable to be used as the first element based on the language information satisfying the language requirement.

10. The system of claim 5, wherein the one or more convolutional neural networks comprise a residual network.

11. The system of claim 5, wherein the one or more classification models comprise a K-nearest neighbors (K-NN) classifier.

12. The system of claim 5, wherein the executable instructions include further instructions that, as a result of execution by the one or more processors, further cause the system to:
   determine contextual content of the first image based on the first set of properties; and
   determine the contextual content is suitable to be used as a second element of the second image; and generate, using the contextual content, a second portion of the second image.

13. A non-transitory computer-readable storage medium storing executable instructions that, as a result of being executed by one or more processors of a computer system, cause the computer system to at least:
- obtain a set of images;
- determine, using one or more convolutional neural networks, a first feature for a first image of the set of images;
- determine, using one or more classification models, first metadata of the first feature;
- determine second metadata for a first portion of a second image;
- determine, based on the first metadata and the second metadata, that the first feature is suitable for use in the first portion of the second image; and
- generate, using the first feature, the first portion of the second image.

14. The non-transitory computer-readable storage medium of claim 13, wherein the instructions, as a result of being executed by the one or more processors of the computer system, further cause the computer system to generate a second portion of the second image using a second feature determined from a third image of the set of images.

15. The non-transitory computer-readable storage medium of claim 13, wherein the instructions, as a result of being executed by the one or more processors of the computer system, further cause the computer system to determine, based on a size of the first feature, that the first feature does not overlap with a second portion of the second image.

16. The non-transitory computer-readable storage medium of claim 13, wherein the first metadata comprises language information for text included in the first feature.

17. The non-transitory computer-readable storage medium of claim 13, wherein the instructions, as a result of being executed by the one or more processors of the computer system, further cause the computer system to downscale the first feature to fit the portion of the second image.

18. The non-transitory computer-readable storage medium of claim 13, wherein the one or more convolutional neural networks comprise ResNet-18, ResNet-34, ResNet-50, ResNet-101, or ResNet-152.

19. The non-transitory computer-readable storage medium of claim 13, wherein the one or more classification models comprise a K-nearest neighbors (K-NN) classifier.

20. The non-transitory computer-readable storage medium of claim 13, wherein the instructions, as a result of being executed by the one or more processors of the computer system, further cause the computer system to:
- persist the first metadata and the first feature in a database;
- submit a request to the database for content that matches the second metadata; and
- receive, as a response to the request, the first feature.

* * * * *